US012732801B2

(12) United States Patent
Kolekar

(10) Patent No.: US 12,732,801 B2
(45) Date of Patent: Sep. 8, 2026

(54) SUPPORT OF AUTHORIZATION OF USER EQUIPMENT BASED SENSING IN A MOBILE SYSTEM

(71) Applicant: Intel Corporation, Santa Clara, CA (US)

(72) Inventor: Abhijeet Kolekar, Leander, TX (US)

(73) Assignee: Intel Corporation, Santa Clara, CA (US)

( * ) Notice: Subject to any disclaimer, the term of this patent is extended or adjusted under 35 U.S.C. 154(b) by 43 days.

(21) Appl. No.: 18/924,720

(22) Filed: Oct. 23, 2024

(65) Prior Publication Data

US 2025/0048088 A1 Feb. 6, 2025

Related U.S. Application Data

(60) Provisional application No. 63/593,172, filed on Oct. 25, 2023.

(51) Int. Cl.

*G06F 21/00* (2013.01)
*H04W 12/02* (2009.01)
*H04W 12/08* (2021.01)

(52) U.S. Cl.

CPC ........... *H04W 12/02* (2013.01); *H04W 12/08* (2013.01)

(58) Field of Classification Search

CPC .............................. H04W 12/02; H04W 12/08
See application file for complete search history.

(56) References Cited

U.S. PATENT DOCUMENTS

2022/0330138 A1* 10/2022 Shan ..................... H04W 48/16
2025/0048072 A1* 2/2025 Liu ....................... H04W 8/005
2025/0080959 A1* 3/2025 Kousaridas ........... H04W 76/10
2025/0240606 A1* 7/2025 Liu ......................... G01S 13/86

* cited by examiner

*Primary Examiner* — William A Corum, Jr.
(74) *Attorney, Agent, or Firm* — Gray Ice Higdon, PLLC

(57) ABSTRACT

This disclosure describes systems, methods, and devices related to sensing authorization. A device may transmit a request for sensing services to a network, the request including one or more parameters related to sensing. The device may receive an authorization response from the network based on a UE's subscription status and privacy settings. The device may execute sensing functions locally on the UE upon receiving authorization from the network. The device may transmit sensing data to the network for exposure to authorized clients. The device may update a UE's privacy profile related to sensing data via a communication with a network function.

18 Claims, 8 Drawing Sheets

600

UE 602

Host platform 608

Application Processing Circuitry 612

Modem platform 610

Protocol Processing Circuitry 614

Digital Baseband Circuitry 616

Transmit Circuitry 618

Receive Circuitry 620

Radio Frequency Circuitry 622

RFFE 624

626

606

AN 604

Host platform 628

Application Processing Circuitry 632

Modem platform 630

Protocol Processing Circuitry 634

Digital Baseband Circuitry 636

Transmit Circuitry 638

Receive Circuitry 640

RF Circuitry 642

RFFE 644

646

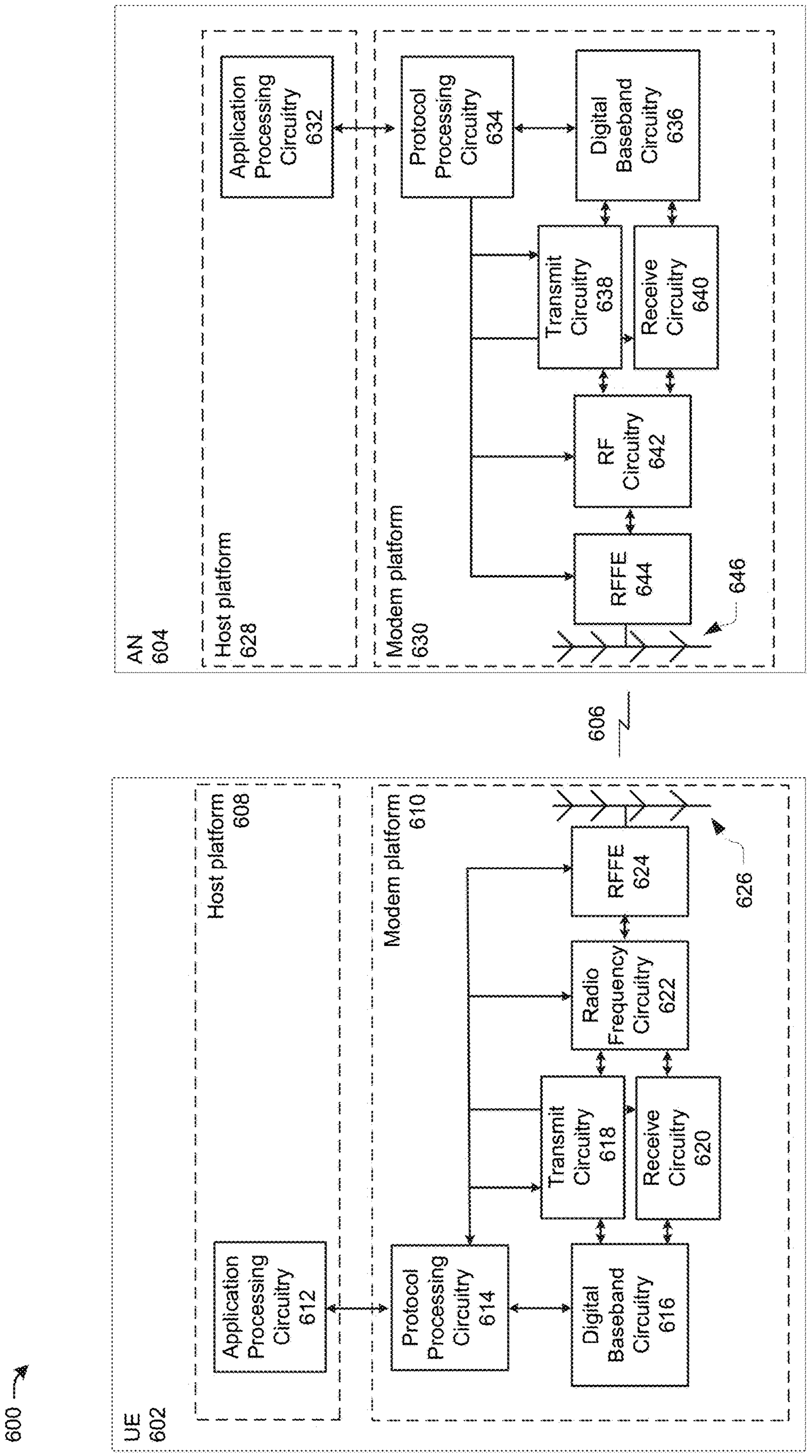

FIG. 6

SUPPORT OF AUTHORIZATION OF USER EQUIPMENT BASED SENSING IN A MOBILE SYSTEM

CROSS-REFERENCE TO RELATED PATENT APPLICATION(S)

This application claims the benefit of U.S. Provisional Application No. 63/593,172, filed Oct. 25, 2023, the disclosure of which is incorporated herein by reference as if set forth in full.

TECHNICAL FIELD

This disclosure generally relates to systems and methods for wireless communications and, more particularly, to support of authorization of user equipment (UE)-based sensing in a mobile system.

BACKGROUND

In computing systems, the efficient transfer of data is critical to ensuring seamless communication between various components and enabling high-performance operations. As systems grow in scale and complexity, traditional methods of data transmission face limitations in speed, reliability, and capacity. There is a need for advancements that can improve the efficiency and scalability of data transfer to meet the demands of modern computing environments.

BRIEF DESCRIPTION OF THE DRAWINGS

FIG. 6 schematically illustrates a wireless network, in accordance with one or more example embodiments of the present disclosure.

DETAILED DESCRIPTION

Figure 1:
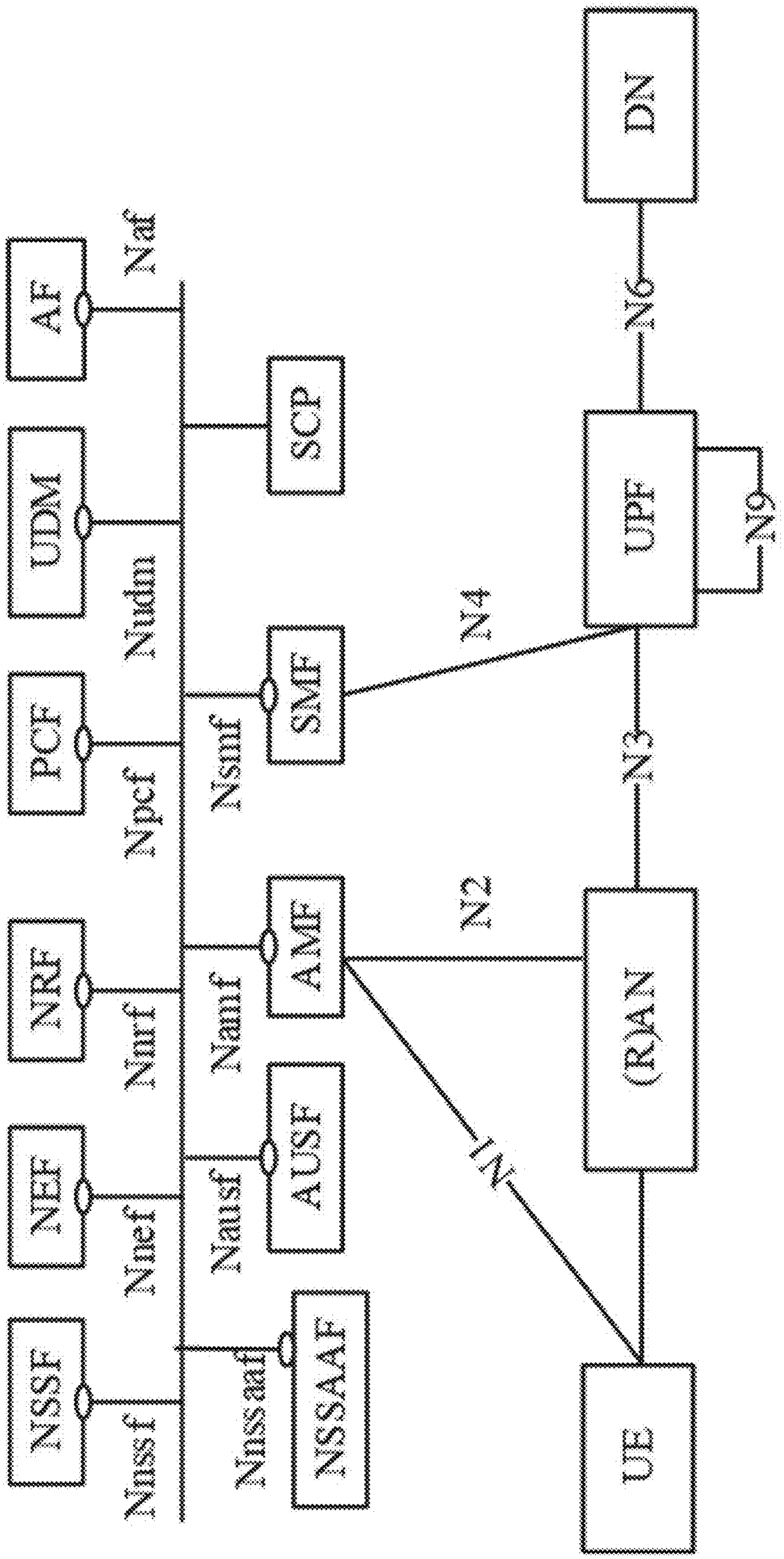
FIGS. 1-3 depict illustrative schematic diagrams for sensing authorization, in accordance with one or more example embodiments of the present disclosure.

The following description and the drawings sufficiently illustrate specific embodiments to enable those skilled in the art to practice them. Other embodiments may incorporate structural, logical, electrical, process, algorithm, and other changes. Portions and features of some embodiments may be included in, or substituted for, those of other embodiments. Embodiments set forth in the claims encompass all available equivalents of those claims.

As part of their Release 19, 3rd Generation Partnership Project (3GPP) has initiated a study on support for Integrated Sensing and Communication that aims at adding a sensing functionality on the radio interface defined by 3GPP.

Wireless sensing technologies aim to acquire information about a remote object and its characteristics without physically contacting it. The object's perception data and surroundings can be analyzed, so meaningful information about the object and its features can be obtained. Another use of wireless sensing is for acquiring characteristics of the environment (e.g. monitoring).

Radar (e.g., radio detection and sensing) is a widely used wireless sensing technology that uses radio waves to determine objects' distance (range), angle, or instantaneous linear velocity. Other sensing technologies, including non-RF sensors, have been used in other areas, e.g., time-of-flight (ToF) cameras, accelerometers, gyroscopes and Lidar.

Integrated Sensing and Communication in a 3GPP 5G system means the sensing capabilities may be provided by the same 5G NR wireless communication system and infrastructure as used for communication, and the sensing information could be derived from RF-based and/or non-RF based sensors. In general, it could involve scenarios of communication-assisted sensing, e.g. where 5G communication system provides sensing services, or sensing-assisted communication, e.g. when sensing information related to the communication channel or environment is used to improve the communication service of the 5G system itself e.g. the sensing information can be used to assist radio resource management, interference mitigation, beam management, mobility, etc.

There are multiple market segments and verticals where 5G-based sensing services can be beneficial for intelligent transportation, aviation, enterprise, smart city, smart home, factories, consumer applications, extended reality (XR), and public sector.

Here are several non-limiting examples of the potential use of 5GS to provide communication-assisted sensing services:

Environment Real-time monitoring (twinning): Using wireless signals to reconstruct the environment map to improve positioning accuracy further and enable environment related applications, such as realizing an array of real-time monitoring related applications including dynamic 3D map for driving assistance, pedestrian flow statistics, intrusion detection, traffic detection and etc.

- Autonomous vehicles/UAV: Autonomous vehicles/UAV applications have some common functional requirements. For example, Autonomous vehicles/UAV shall support Detect and Avoid (DAA) to avoid obstacles. Meanwhile, Autonomous vehicles/UAV shall have the capability to monitor path information, like selecting routes, complying with traffic regulations.
- Air pollution or weather monitoring: The quality of the received wireless signal displays different attenuation characteristics with changes in air humidity, air particulate matter (PM) concentration, carrier frequency and etc., which can be used for weather or air quality detection.
- Indoor Health Care and Intrusion Detection. Respiration rate estimation, breathing depth estimation, apnoea detection, elders' vital sign monitoring and indoor intrusion detection can be realized.

Example embodiments of the present disclosure relate to systems, methods, and devices for support of authorization of user equipment (UE)-based sensing in a mobile system.

Some embodiments are described herein under the assumption that network-based sensing in 5GS is supported using a centralized 5GC function known as the Sensing Service Management Function (SSMF). This centralized approach enhances the efficiency of managing and coordinating sensing activities across the network by leveraging advanced algorithms and data processing techniques. The SSMF interacts with a third-party Application Function (AF)

via the Network Exposure Function (NEF) and with the RAN nodes directly or through the Access and Mobility Management Function (AMF). The AF plays a crucial role by providing specific services or applications, utilizing network resources, and managing data flow securely. The SSMF issues individual requests to each RAN node, collects their sensing results, processes the combined inputs using sophisticated data integration methods, and delivers a synthetic result to the AF. This process optimizes resource allocation and enhances network performance by providing precise environmental data, such as traffic density or weather conditions, to the AF.

Various embodiments herein may address the following aspects of security.

The AF interacts with the 5GC network to provide sensing services securely by using the following security features:

1) Authorization for Sensing service: The AF must be authorized to access the Sensing service.

2) Security and privacy protection for Sensing UE discovery: The UE's privacy must be protected when the AF discovers the UE.

3) Authorization procedure for Sensing service exposure through 5GC control plane: The authorization procedure for Sensing service exposure through the 5GC control plane reuses the MO-LR authorization procedure.

The above descriptions are for purposes of illustration and are not meant to be limiting. Numerous other examples, configurations, processes, algorithms, etc., may exist, some of which are described in greater detail below. Example embodiments will now be described with reference to the accompanying figures.

This disclosure generally relates to systems and methods for wireless communications and, more particularly, to sensing authorization.

Referring to FIG. 1, there is shown the 5G system architecture.

Figure 2:
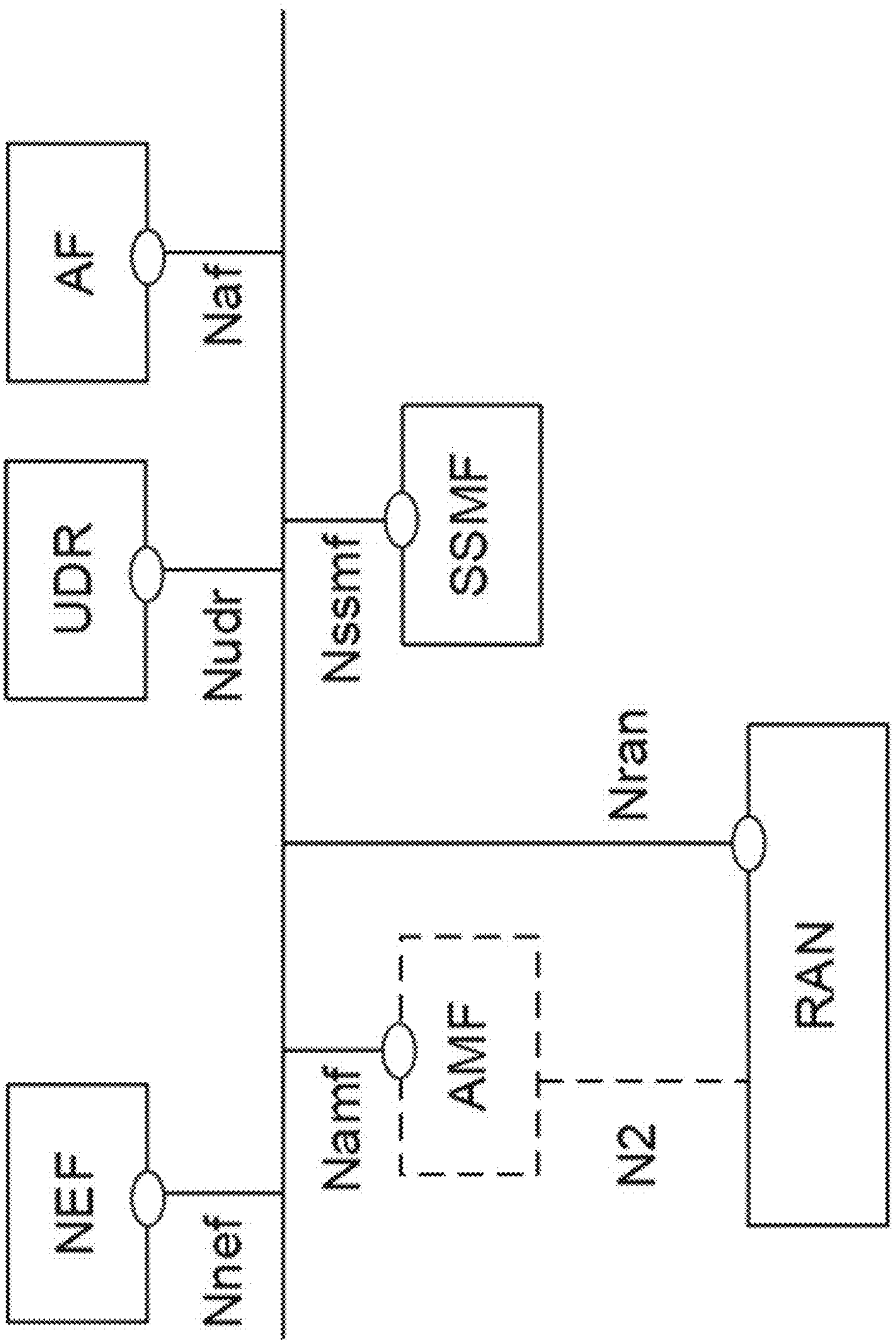

Referring to FIG. 2, there is shown the system architecture for network-based sensing (service based interface (SBI) representation).

Figure 3:
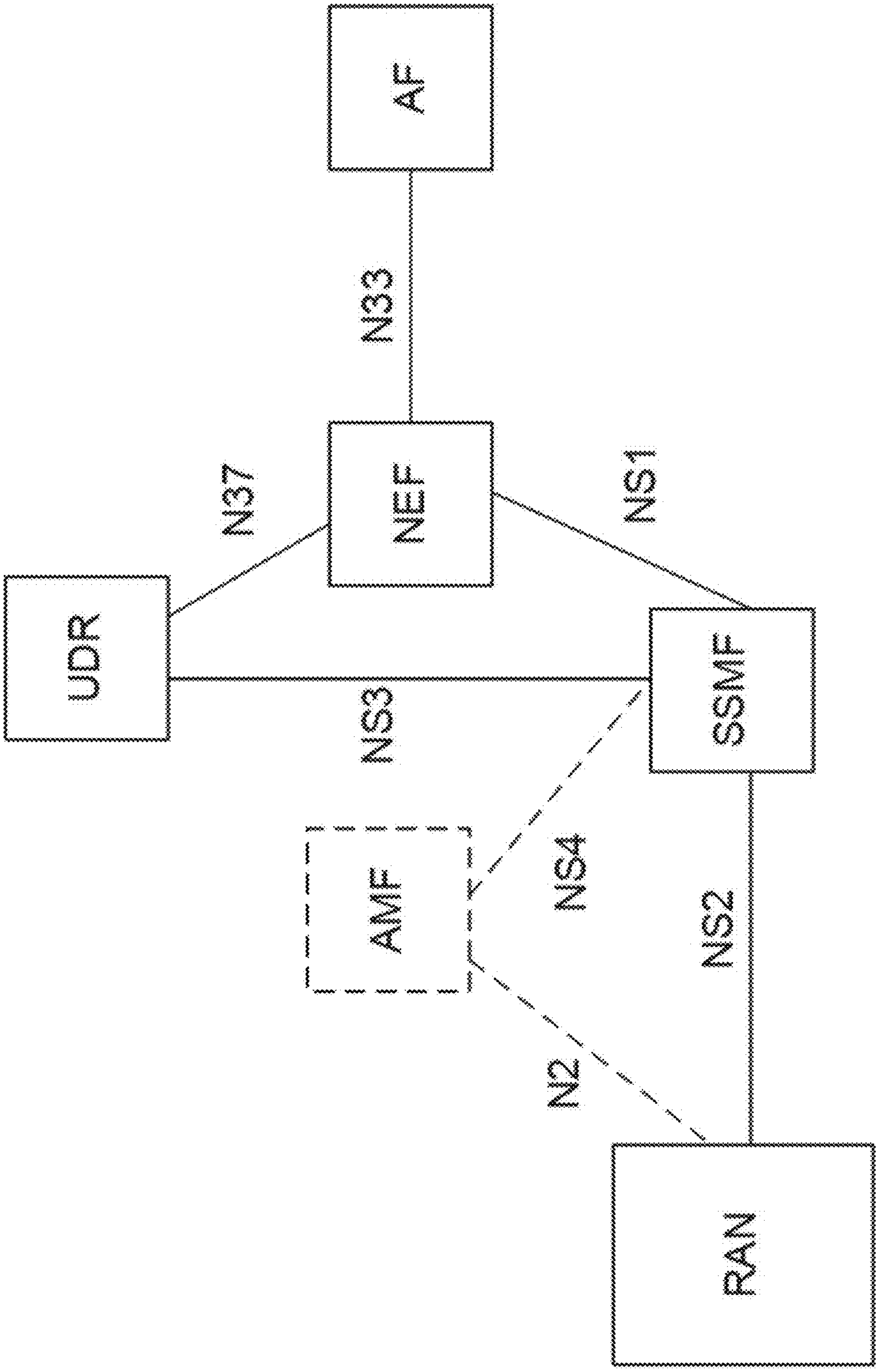

Referring to FIG. 3, there is shown the system architecture for network-based sensing (reference point representation).

Various embodiments herein provide a system architecture for support of the sensing service. Depicted in FIG. 1 is the 5G system architecture in service-based interface representation. Embodiments may build on top the existing 5GS architecture in FIG. 1.

Embodiments herein may assume that the 5GS sensing service can be provided to a third party Application Function (AF) via the Network Exposure Function (NEF).

The system architecture for network-based sensing in the 5GS is illustrated in FIG. 2 (service-based interface (SBI) representations) and FIG. 3 (reference point representation). Network-based sensing in this disclosure refers to a wireless sensing technique whereby the network uses radio resources for transmission of the sensing signal and reception and processing of the reflected signal, without interacting with specific UEs.

The central role in providing the sensing service is a new network function in the 5G Core (5GC) network referred to as the Sensing Service Management Function (SSMF). It is noted that the SSMF is a logical function and in some deployments it may physically be located in the RAN.

The following is a list of example sensing-related functionality in each of the network functions depicted in FIG. 2 and FIG. 3: The Application Function (AF) requests sensing (e.g., sensing type, geographical area, etc.) and collects the sensing results. The Network Exposure Function (NEF) authorizes the AF requests with the Unified Data Repository (UDR), e.g., using the Common API Framework for 3GPP northbound APIs (CAPIF) defined in 3GPP TS 23.222. It finds a suitable SSMF (or multiple SSMFs) based on the information in the AF request (e.g., geo area) and relays messages between AF and SSMF. The Sensing Service Management Function (SSMF) maps the geographical area in the request to a set of gNB IDs (possibly taking service area restrictions into account) and generates sensing demands towards the selected gNBs or UEs, including information such as required resolution, use of specific sensing algorithms, etc. In case UE has sensing functionality; in that case UE needs to be authorized with the network to accept process sensing data.

In one or more embodiments, a sensing authorization system may facilitate procedures for authorization of AF/5GC NF for Sensing service exposure.

The process of authorization will be conducted to determine if a User Equipment (UE) or a third-party Application Function (AF) is permitted to utilize the ISAC service, taking into account factors such as the subscription status and privacy settings of the object and the surrounding environment (e.g., UE1, UE2, . . . , UEn) as indicated in the request message. Suppose none of the User Equipments (UEs) provide authorization for Sensing exposure. In that case, the Service-based Session Management Function (SSMF) will decline the service request originating from the (AF)/5G Core Network Function (NF).

Upon receiving the service request for Sensing from the AF/5GC NF, the SSMF interacts with the UDM to verify the privacy profile of the User Equipment (UE). The baseline for the User Equipment (UE) privacy profile for Sensing services is established by the UE Sensing Privacy Profile.

The SSMF engages in communication with the AMF to solicit the Sensing outcome of User Equipments (UEs), which may indicate an action pertaining to privacy. If the indication of privacy check-related activity suggests that the User Equipment (UE) must be either notified or notified with privacy verification, a notification invoke message is transmitted to the UE provided that the signaling link has been established. If the Sensing service is prohibited by the User Equipment (UE), or if the construction of a signaling connection fails and notification from the UE (including information with privacy verification) is necessary, the Access and Mobility Management Function (AMF) is responsible for delivering a failure answer to SSMF.

In one or more embodiments, a sensing authorization system may facilitate procedures for approval of UE for Sensing service exposure.

5GC control plane can expose the sensing service to the sensing client UE. The Sensing Client UE must be permitted to access the Sensing service. If the Client UE is not authorized, the request for the Sensing service will be denied.

In one or more embodiments, a sensing authorization system may facilitate a procedure of UE privacy verification for UE-only operation.

For UE-only Operation in which the network does not participate in Sensing, the authorization for UE privacy is based on locally configured privacy verification information to determine whether its Sensing-related information can be exposed to the peer UE or not. If the privacy profile permits Sensing exposure, the UE (e.g., the Sensing UE) accepts the request to expose its Sensing-related data and continues.

In one example, the procedure may be performed as follows: The UE transmits an enrollment request to the AF or 5GC NF. The AF or 5GC NF verifies the UE's qualification for exposure to Sensing service. The AF or 5GC NF transmits an authorization response to the UE if the UE is eligible. The User Equipment initiates the Sensing service.

In one or more embodiments, a sensing authorization system may facilitate UE Sensing privacy. A Sensing Client or AF may be authorized to retrieve UE Sensing for commercial usage. A UE and AF can turn off Sensing Client and AF access to UE Sensing information via UE Sensing privacy. Subscription and privacy profile handling support UE Sensing privacy.

UE Sensing privacy profiles are part of UE subscription data in the UDM and queried by another NF like SSMF or NEF. The UDM may keep the UE privacy profile in the UDR. The UE and AF can update portion of the UE privacy profile and send it to the network as a UDR update with UE Sensing privacy profile processing. The UE Sensing privacy profile controls whether Sensing Client and AF queries are authorized.

In one or more embodiments, a sensing authorization system may facilitate content of UE Sensing Privacy Profile. The UE Sensing privacy profile may include information related to classes of Sensing Client, referred to as "privacy classes," which are permitted, or conditionally allowed, to obtain Sensing information for the UE.

Privacy Classes:

- Sensing allowed without notifying the UE user (default case);
- Sensing allowed with notification to the UE user;
- Sensing requires notification and verification by the UE user; Sensing is allowed only if granted by the UE user or if there is no response to the information;
- Sensing requires notification and verification by the UE user; Sensing is allowed only if granted by the UE user.

A default subscription, as described in the UE Sensing privacy profile for any value-added Sensing Client or AF, defines one of the following alternatives:

- Sensing not allowed (default case);
- Sensing allowed with notification to the UE user;
- Sensing requires notification and verification by the UE user; Sensing is allowed only if granted by the UE user or if there is no response to the information;
- Sensing requires notification and verification by the UE user; Sensing is allowed only if granted by the UE user.

The subscription options for the Call/Session, unrelated Class may further indicate additional information for each identified Sensing Client, for each identified service type, and for the unidentified Sensing Clients as follows:

- A valid period for Sensing;
- A valid geographic area for Sensing.

The UE Sensing privacy profile may also indicate that any unidentified Sensing Client or a Sensing Client associated with an identified service type shall provide a codeword to locate the UE, where the codeword is verified by either an SSMF or the UE. When verification by an SSMF is indicated, a list of one or more codewords is included as part of the UE Sensing privacy profile.

In one or more embodiments, a sensing authorization system may facilitate sensing Privacy Indication (SPI).

The Sensing Privacy Indication controls whether Sensing Clients can request UE.

The SPI may include one of these global parameters for all Sensing Clients and AFs:

- Disallowed UE sensing
- UE sensing is enabled by default, and Sensing Client requests are granted depending on their privacy clauses SPI has several possible settings, such as:

- A valid period for SPI, containing start and finish times.

UE Sensing privacy profile SPI creation or update is determined by the UE and sent to the network via N1 NAS message. UE can update it anytime.

Using NEF, an authorized AF can provision the SPI in the UE Sensing privacy profile for individual UEs.

UE Sensing privacy profile changes are also notified to subscribers SSMF and NEF by the UDM:

- Target the UE identity (GPSI or SUPI);
  - UE Sensing privacy profile updated.

In one or more embodiments, a sensing authorization system may manage sensing services by mapping a geographical area in a request to a set of gNB IDs. The system may generate sensing requests towards selected gNBs or UEs, with these requests comprising information related to resolution and the use of specific sensing algorithms. In one or more embodiments, the UE may have sensing functionality and may require authorization with a network to accept and process sensing data.

In one or more embodiments, a sensing authorization system may authorize a User Equipment (UE) or an Application Function (AF) for Sensing service exposure by determining if the UE or AF is permitted to utilize the ISAC service based on subscription status and privacy settings of the object and surrounding environment. The system may include a Service-based Session Management Function (SSMF) configured to decline the service request if none of the UEs provide authorization for Sensing exposure. In one or more embodiments, the SSMF may verify the privacy profile of the UE by communicating with a User Data Management (UDM) system.

In one or more embodiments, a sensing authorization system may authorize User Equipment (UE) for Sensing service exposure by exposing the sensing service to a sensing client UE and determining if the Sensing Client UE is permitted to access the Sensing service. The system may deny the request for the Sensing service if the Client UE is not authorized. In one or more embodiments, a procedure for UE privacy verification for UE-only operation may authorize UE privacy based on locally configured privacy verification information and determine if Sensing-related information of the UE can be exposed to a peer UE. The system may transmit an enrollment request from the UE to the AF or 5GC NF and verify the UE's qualification for Sensing service exposure by the AF or 5GC NF, initiating the Sensing service upon successful verification.

In one or more embodiments, a sensing authorization system may manage UE Sensing privacy by authorizing a Sensing Client or AF to retrieve UE Sensing for commercial usage and providing a UE privacy setting allowing a UE or AF to disable Sensing Client and AF access to UE Sensing information. The system may handle subscription and privacy profiles to support UE Sensing privacy. In one or more embodiments, the UE Sensing privacy profiles may be part of UE subscription data in a UDM and may be queried by another Network Function (NF) such as SSMF or NEF. A Sensing Privacy Indication (SPI) system may include a control mechanism determining whether Sensing Clients can request UE Sensing and one or more global parameters for Sensing Clients and AFs, including disallowed UE sensing and default UE sensing based on privacy classes. The system may allow a UE to update its Sensing privacy profile via a N1 NAS message and may enable an authorized AF to provision the SPI in the UE Sensing privacy profile for individual UEs using a Network Exposure Function (NEF). In one or more embodiments, changes to the UE Sensing privacy profile may be notified to subscribers SSMF and NEF by the UDM, targeting the UE identity.

Figure 4:
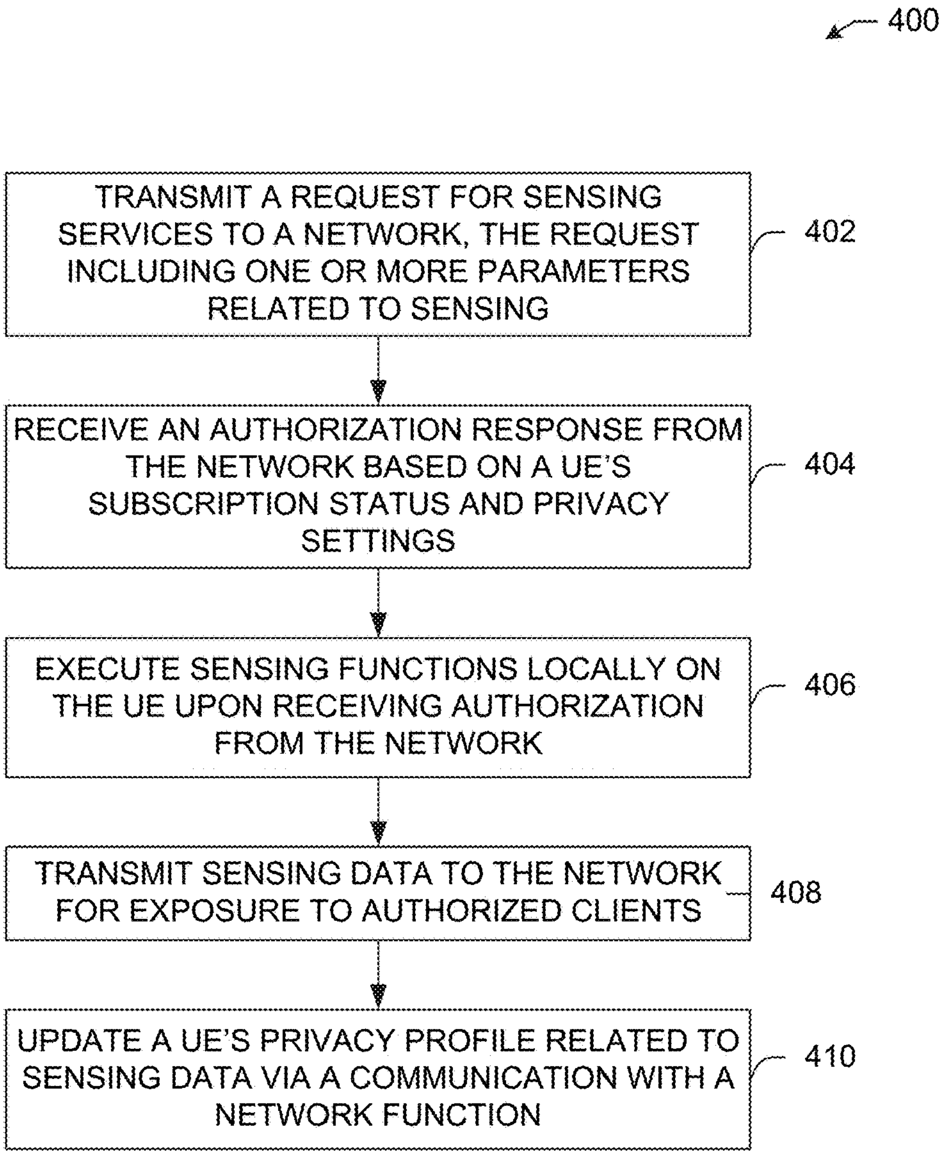
FIG. 4 illustrates a flow diagram of a process for an illustrative sensing authorization system, in accordance with one or more example embodiments of the present disclosure.

In some embodiments, the electronic device(s), network(s), system(s), chip(s) or component(s), or portions or implementations thereof, of FIGS. 5-8, or some other figure herein, may be configured to perform one or more processes, techniques, or methods as described herein, or portions thereof. One such process is depicted in FIG. 4.

For example, the process may include, at 402, transmitting a request for sensing services to a network, the request including one or more parameters related to sensing.

The process further includes, at 404, receiving an authorization response from the network based on a UE's subscription status and privacy settings.

The process further includes, at 406, executing sensing functions locally on the UE upon receiving authorization from the network.

The process further includes, at 408, executing sensing functions locally on the UE upon receiving authorization from the network.

The process further includes, at 410, transmitting sensing data to the network for exposure to authorized clients.

The process further includes, at 412, updating a UE's privacy profile related to sensing data via a communication with a network function.

In one or more embodiments, the processing circuitry may verify privacy settings with a UDM system before transmitting sensing data and may decline to send data if privacy settings restrict sharing with external entities. It may transmit an enrollment request to a network function or AF to initiate a sensing session post-authorization. The device may receive notifications from the network about whether sensing data can be exposed to a peer UE based on local privacy settings and may disable access to sensing data by unauthorized network clients or AFs. It may update a sensing privacy profile via an N1 NAS message, allowing dynamic privacy setting changes, and initiate a sensing service session by verifying a peer UE's sensing privacy profile before data transmission. The device may receive updates from the network regarding changes to the sensing privacy profile and apply these updates dynamically. Additionally, it may communicate with a privacy management system to enforce global privacy parameters that determine data sharing based on predefined privacy classes.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

It is understood that the above descriptions are for purposes of illustration and are not meant to be limiting.

FIGS. 5-8 illustrate various systems, devices, and components that may implement aspects of disclosed embodiments.

Figure 5:
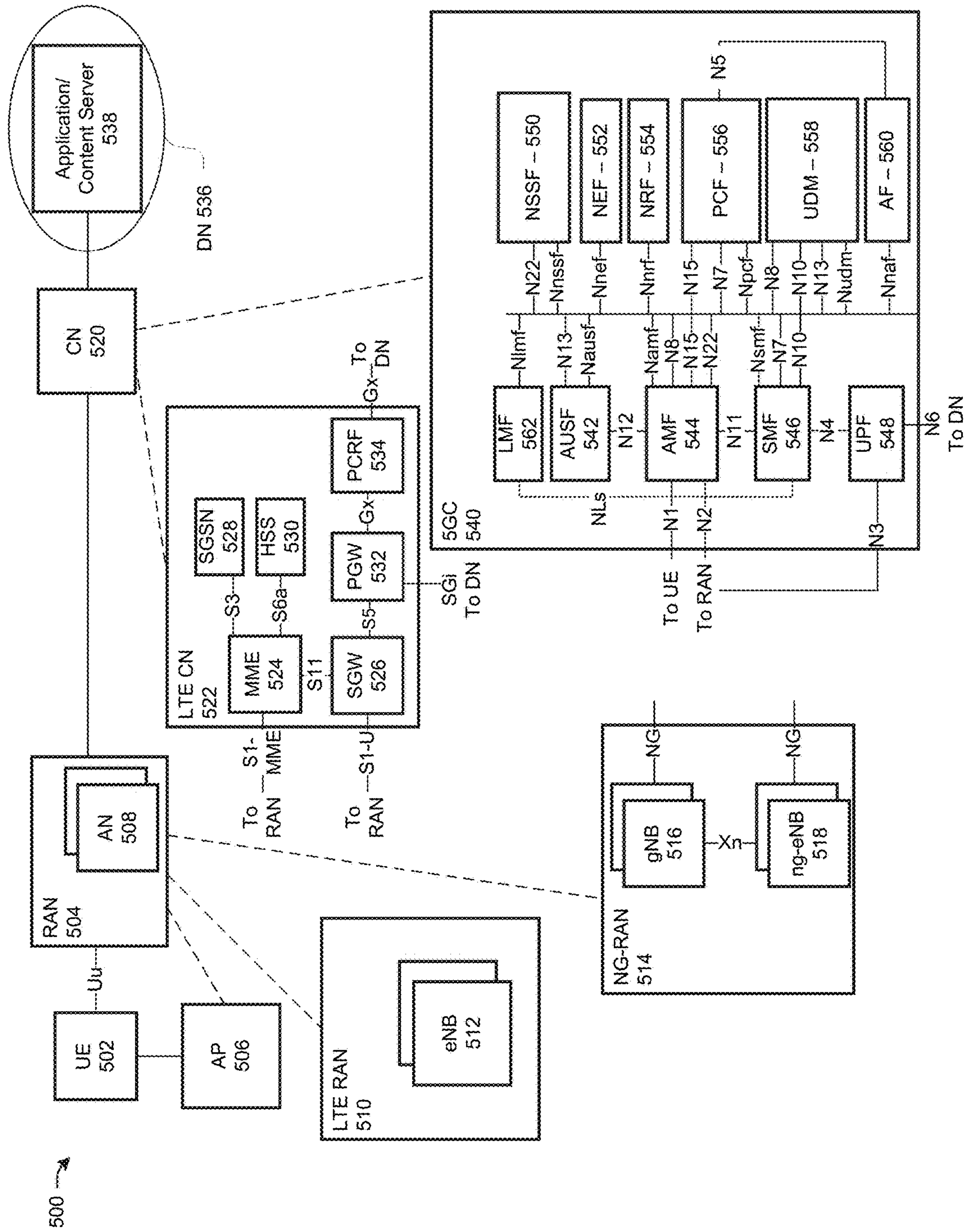
FIG. 5 illustrates an example network architecture, in accordance with one or more example embodiments of the present disclosure.

FIG. 5 illustrates an example network architecture 500 according to various embodiments. The network 500 may operate in a manner consistent with 3GPP technical specifications for LTE or 5G/NR systems. However, the example embodiments are not limited in this regard and the described embodiments may apply to other networks that benefit from the principles described herein, such as future 3GPP systems, or the like.

The network 500 includes a UE 502, which is any mobile or non-mobile computing device designed to communicate with a RAN 504 via an over-the-air connection. The UE 502 is communicatively coupled with the RAN 504 by a Uu interface, which may be applicable to both LTE and NR systems. Examples of the UE 502 include, but are not limited to, a smartphone, tablet computer, wearable computer, desktop computer, laptop computer, in-vehicle infotainment system, in-car entertainment system, instrument cluster, head-up display (HUD) device, onboard diagnostic device, dashtop mobile equipment, mobile data terminal, electronic engine management system, electronic/engine control unit, electronic/engine control module, embedded system, sensor, microcontroller, control module, engine management system, networked appliance, machine-type communication device, machine-to-machine (M2M), device-to-device (D2D), machine-type communication (MTC) device, Internet of Things (IoT) device, and/or the like. The network 500 may include a plurality of UEs 502 coupled directly with one another via a D2D, ProSe, PC5, and/or sidelink (SL) interface. These UEs 502 may be M2M/D2D/MTC/IoT devices and/or vehicular systems that communicate using physical sidelink channels such as, but not limited to, PSBCH, PSDCH, PSSCH, PSCCH, PSFCH, etc. The UE 502 may perform blind decoding attempts of SL channels/links according to the various embodiments herein.

In some embodiments, the UE 502 may additionally communicate with an AP 506 via an over-the-air (OTA) connection. The AP 506 manages a WLAN connection, which may serve to offload some/all network traffic from the RAN 504. The connection between the UE 502 and the AP 506 may be consistent with any IEEE 802.11 protocol. Additionally, the UE 502, RAN 504, and AP 506 may utilize cellular-WLAN aggregation/integration (e.g., LWA/LWIP). Cellular-WLAN aggregation may involve the UE 502 being configured by the RAN 504 to utilize both cellular radio resources and WLAN resources.

The RAN 504 includes one or more access network nodes (ANs) 508. The ANs 508 terminate air-interface(s) for the UE 502 by providing access stratum protocols including RRC, PDCP, RLC, MAC, and PHY/L1 protocols. In this manner, the AN 508 enables data/voice connectivity between CN 520 and the UE 502. The ANs 508 may be a macrocell base station or a low power base station for providing femtocells, picocells or other like cells having smaller coverage areas, smaller user capacity, or higher bandwidth compared to macrocells; or some combination thereof. In these implementations, an AN 508 be referred to as a BS, gNB, RAN node, eNB, ng-eNB, NodeB, RSU, TRxP, etc.

One example implementation is a "CU/DU split" architecture where the ANs 508 are embodied as a gNB-Central Unit (CU) that is communicatively coupled with one or more gNB-Distributed Units (DUs), where each DU may be communicatively coupled with one or more Radio Units (RUs) (also referred to as RRHs, RRUs, or the like) (see e.g., 3GPP TS 38.401 v16.1.0 (2020-03)). In some implementations, the one or more RUs may be individual RSUs. In some implementations, the CU/DU split may include an ng-eNB-CU and one or more ng-eNB-DUs instead of, or in addition to, the gNB-CU and gNB-DUs, respectively. The ANs 508 employed as the CU may be implemented in a discrete device or as one or more software entities running on server computers as part of, for example, a virtual network including a virtual Base Band Unit (BBU) or BBU pool, cloud RAN (CRAN), Radio Equipment Controller (REC), Radio Cloud Center (RCC), centralized RAN (C-RAN), virtualized RAN (vRAN), and/or the like (although these terms may refer to different implementation concepts). Any other type of architectures, arrangements, and/or configurations can be used.

The plurality of ANs may be coupled with one another via an X2 interface (if the RAN 504 is an LTE RAN or Evolved Universal Terrestrial Radio Access Network (E-UTRAN) 510) or an Xn interface (if the RAN 504 is a NG-RAN 514). The X2/Xn interfaces, which may be separated into control/user plane interfaces in some embodiments, may allow the ANs to communicate information related to handovers, data/context transfers, mobility, load management, interference coordination, etc.

The ANs of the RAN 504 may each manage one or more cells, cell groups, component carriers, etc. to provide the UE 502 with an air interface for network access. The UE 502 may be simultaneously connected with a plurality of cells provided by the same or different ANs 508 of the RAN 504. For example, the UE 502 and RAN 504 may use carrier aggregation to allow the UE 502 to connect with a plurality of component carriers, each corresponding to a Pcell or Scell. In dual connectivity scenarios, a first AN 508 may be a master node that provides an MCG and a second AN 508 may be secondary node that provides an SCG. The first/second ANs 508 may be any combination of eNB, gNB, ng-eNB, etc.

The RAN 504 may provide the air interface over a licensed spectrum or an unlicensed spectrum. To operate in the unlicensed spectrum, the nodes may use LAA, eLAA, and/or feLAA mechanisms based on CA technology with PCells/Scells. Prior to accessing the unlicensed spectrum, the nodes may perform medium/carrier-sensing operations based on, for example, a listen-before-talk (LBT) protocol.

In V2X scenarios the UE 502 or AN 508 may be or act as a roadside unit (RSU), which may refer to any transportation infrastructure entity used for V2X communications. An RSU may be implemented in or by a suitable AN or a stationary (or relatively stationary) UE. An RSU implemented in or by: a UE may be referred to as a "UE-type RSU"; an eNB may be referred to as an "eNB-type RSU"; a gNB may be referred to as a "gNB-type RSU"; and the like. In one example, an RSU is a computing device coupled with radio frequency circuitry located on a roadside that provides connectivity support to passing vehicle UEs. The RSU may also include internal data storage circuitry to store intersection map geometry, traffic statistics, media, as well as applications/software to sense and control ongoing vehicular and pedestrian traffic. The RSU may provide very low latency communications required for high speed events, such as crash avoidance, traffic warnings, and the like. Additionally or alternatively, the RSU may provide other cellular/WLAN communications services. The components of the RSU may be packaged in a weatherproof enclosure suitable for outdoor installation, and may include a network interface controller to provide a wired connection (e.g., Ethernet) to a traffic signal controller or a backhaul network.

In some embodiments, the RAN 504 may be an E-UTRAN 510 with one or more eNBs 512. The an E-UTRAN 510 provides an LTE air interface (Uu) with the following characteristics: SCS of 15 kHz; CP-OFDM waveform for DL and SC-FDMA waveform for UL; turbo codes for data and TBCC for control; etc. The LTE air interface may rely on CSI-RS for CSI acquisition and beam management; PDSCH/PDCCH DMRS for PDSCH/PDCCH demodulation; and CRS for cell search and initial acquisition, channel quality measurements, and channel estimation for coherent demodulation/detection at the UE. The LTE air interface may operating on sub-6 GHz bands.

In some embodiments, the RAN 504 may be an next generation (NG)-RAN 514 with one or more gNB 516 and/or on or more ng-eNB 518. The gNB 516 connects with 5G-enabled UEs 502 using a 5G NR interface. The gNB 516 connects with a 5GC 540 through an NG interface, which includes an N2 interface or an N3 interface. The ng-eNB 518 also connects with the 5GC 540 through an NG interface, but may connect with a UE 502 via the Uu interface. The gNB 516 and the ng-eNB 518 may connect with each other over an Xn interface.

In some embodiments, the NG interface may be split into two parts, an NG user plane (NG-U) interface, which carries traffic data between the nodes of the NG-RAN 514 and a UPF 548 (e.g., N3 interface), and an NG control plane (NG-C) interface, which is a signaling interface between the nodes of the NG-RAN 514 and an AMF 544 (e.g., N2 interface).

The NG-RAN 514 may provide a 5G-NR air interface (which may also be referred to as a Uu interface) with the following characteristics: variable SCS; CP-OFDM for DL, CP-OFDM and DFT-s-OFDM for UL; polar, repetition, simplex, and Reed-Muller codes for control and LDPC for data. The 5G-NR air interface may rely on CSI-RS, PDSCH/PDCCH DMRS similar to the LTE air interface. The 5G-NR air interface may not use a CRS, but may use PBCH DMRS for PBCH demodulation; PTRS for phase tracking for PDSCH; and tracking reference signal for time tracking. The 5G-NR air interface may operating on FR1 bands that include sub-6 GHz bands or FR2 bands that include bands from 24.25 GHz to 52.6 GHz. The 5G-NR air interface may include an SSB that is an area of a downlink resource grid that includes PSS/SSS/PBCH.

The 5G-NR air interface may utilize BWPs for various purposes. For example, BWP can be used for dynamic adaptation of the SCS. For example, the UE 502 can be configured with multiple BWPs where each BWP configuration has a different SCS. When a BWP change is indicated to the UE 502, the SCS of the transmission is changed as well. Another use case example of BWP is related to power saving. In particular, multiple BWPs can be configured for the UE 502 with different amount of frequency resources (e.g., PRBs) to support data transmission under different traffic loading scenarios. A BWP containing a smaller number of PRBs can be used for data transmission with small traffic load while allowing power saving at the UE 502 and in some cases at the gNB 516. A BWP containing a larger number of PRBs can be used for scenarios with higher traffic load.

The RAN 504 is communicatively coupled to CN 520 that includes network elements and/or network functions (NFs) to provide various functions to support data and telecommunications services to customers/subscribers (e.g., UE 502). The components of the CN 520 may be implemented in one physical node or separate physical nodes. In some embodiments, NFV may be utilized to virtualize any or all of the functions provided by the network elements of the CN 520 onto physical compute/storage resources in servers, switches, etc. A logical instantiation of the CN 520 may be referred to as a network slice, and a logical instantiation of a portion of the CN 520 may be referred to as a network sub-slice.

The CN 520 may be an LTE CN 522 (also referred to as an Evolved Packet Core (EPC) 522). The EPC 522 may include MME 524, SGW 526, SGSN 528, HSS 530, PGW 532, and PCRF 534 coupled with one another over interfaces (or "reference points") as shown. The NFs in the EPC 522 are briefly introduced as follows.

The MME 524 implements mobility management functions to track a current location of the UE 502 to facilitate paging, bearer activation/deactivation, handovers, gateway selection, authentication, etc.

The SGW 526 terminates an S1 interface toward the RAN 510 and routes data packets between the RAN 510 and the EPC 522. The SGW 526 may be a local mobility anchor point for inter-RAN node handovers and also may provide an anchor for inter-3GPP mobility. Other responsibilities may include lawful intercept, charging, and some policy enforcement.

The SGSN 528 tracks a location of the UE 502 and performs security functions and access control. The SGSN 528 also performs inter-EPC node signaling for mobility between different RAT networks; PDN and S-GW selection as specified by MME 524; MME 524 selection for handovers; etc. The S3 reference point between the MME 524 and the SGSN 528 enable user and bearer information exchange for inter-3GPP access network mobility in idle/active states.

The HSS 530 includes a database for network users, including subscription-related information to support the network entities' handling of communication sessions. The HSS 530 can provide support for routing/roaming, authentication, authorization, naming/addressing resolution, location dependencies, etc. An S6a reference point between the HSS 530 and the MME 524 may enable transfer of subscription and authentication data for authenticating/authorizing user access to the EPC 520.

The PGW 532 may terminate an SGi interface toward a data network (DN) 536 that may include an application (app)/content server 538. The PGW 532 routes data packets between the EPC 522 and the data network 536. The PGW 532 is communicatively coupled with the SGW 526 by an S5 reference point to facilitate user plane tunneling and tunnel management. The PGW 532 may further include a node for policy enforcement and charging data collection (e.g., PCEF). Additionally, the SGi reference point may communicatively couple the PGW 532 with the same or different data network 536. The PGW 532 may be communicatively coupled with a PCRF 534 via a Gx reference point.

The PCRF 534 is the policy and charging control element of the EPC 522. The PCRF 534 is communicatively coupled to the app/content server 538 to determine appropriate QoS and charging parameters for service flows. The PCRF 532 also provisions associated rules into a PCEF (via Gx reference point) with appropriate TFT and QCI.

The CN 520 may be a 5GC 540 including an AUSF 542, AMF 544, SMF 546, UPF 548, NSSF 550, NEF 552, NRF 554, PCF 556, UDM 558, and AF 560 coupled with one another over various interfaces as shown. The NFs in the 5GC 540 are briefly introduced as follows.

The AUSF 542 stores data for authentication of UE 502 and handle authentication-related functionality. The AUSF 542 may facilitate a common authentication framework for various access types.

The AMF 544 allows other functions of the 5GC 540 to communicate with the UE 502 and the RAN 504 and to subscribe to notifications about mobility events with respect to the UE 502. The AMF 544 is also responsible for registration management (e.g., for registering UE 502), connection management, reachability management, mobility management, lawful interception of AMF-related events, and access authentication and authorization. The AMF 544 provides transport for SM messages between the UE 502 and the SMF 546, and acts as a transparent proxy for routing SM messages. AMF 544 also provides transport for SMS messages between UE 502 and an SMSF. AMF 544 interacts with the AUSF 542 and the UE 502 to perform various security anchor and context management functions. Furthermore, AMF 544 is a termination point of a RAN-CP interface, which includes the N2 reference point between the RAN 504 and the AMF 544. The AMF 544 is also a termination point of NAS (N1) signaling, and performs NAS ciphering and integrity protection.

AMF 544 also supports NAS signaling with the UE 502 over an N3IWF interface. The N3IWF provides access to untrusted entities. N3IWF may be a termination point for the N2 interface between the (R) AN 504 and the AMF 544 for the control plane, and may be a termination point for the N3 reference point between the (R) AN 514 and the 548 for the user plane. As such, the AMF 544 handles N2 signalling from the SMF 546 and the AMF 544 for PDU sessions and QoS, encapsulate/de-encapsulate packets for IPSec and N3 tunnelling, marks N3 user-plane packets in the uplink, and enforces QoS corresponding to N3 packet marking taking into account QoS requirements associated with such marking received over N2. N3IWF may also relay UL and DL control-plane NAS signalling between the UE 502 and AMF 544 via an N1 reference point between the UE 502 and the AMF 544, and relay uplink and downlink user-plane packets between the UE 502 and UPF 548. The N3IWF also provides mechanisms for IPsec tunnel establishment with the UE 502. The AMF 544 may exhibit an Namf service-based interface, and may be a termination point for an N14 reference point between two AMFs 544 and an N17 reference point between the AMF 544 and a 5G-EIR (not shown by FIG. 5).

The SMF 546 is responsible for SM (e.g., session establishment, tunnel management between UPF 548 and AN 508); UE IP address allocation and management (including optional authorization); selection and control of UP function; configuring traffic steering at UPF 548 to route traffic to proper destination; termination of interfaces toward policy control functions; controlling part of policy enforcement, charging, and QoS; lawful intercept (for SM events and interface to L1 system); termination of SM parts of NAS messages; downlink data notification; initiating AN specific SM information, sent via AMF 544 over N2 to AN 508; and determining SSC mode of a session. SM refers to management of a PDU session, and a PDU session or "session" refers to a PDU connectivity service that provides or enables the exchange of PDUs between the UE 502 and the DN 536.

The UPF 548 acts as an anchor point for intra-RAT and inter-RAT mobility, an external PDU session point of interconnect to data network 536, and a branching point to support multi-homed PDU session. The UPF 548 also performs packet routing and forwarding, packet inspection, enforces user plane part of policy rules, lawfully intercept packets (UP collection), performs traffic usage reporting, perform QoS handling for a user plane (e.g., packet filtering, gating, UL/DL rate enforcement), performs uplink traffic verification (e.g., SDF-to-QoS flow mapping), transport level packet marking in the uplink and downlink, and performs downlink packet buffering and downlink data notification triggering. UPF 548 may include an uplink classifier to support routing traffic flows to a data network.

The NSSF 550 selects a set of network slice instances serving the UE 502. The NSSF 550 also determines allowed NSSAI and the mapping to the subscribed S-NSSAIs, if needed. The NSSF 550 also determines an AMF set to be used to serve the UE 502, or a list of candidate AMFs 544 based on a suitable configuration and possibly by querying the NRF 554. The selection of a set of network slice instances for the UE 502 may be triggered by the AMF 544 with which the UE 502 is registered by interacting with the NSSF 550; this may lead to a change of AMF 544. The NSSF 550 interacts with the AMF 544 via an N22 reference point; and may communicate with another NSSF in a visited network via an N31 reference point (not shown).

The NEF 552 securely exposes services and capabilities provided by 3GPP NFs for third party, internal exposure/re-exposure, AFs 560, edge computing or fog computing systems (e.g., edge compute node, etc. In such embodiments, the NEF 552 may authenticate, authorize, or throttle the AFs. NEF 552 may also translate information exchanged with the AF 560 and information exchanged with internal network functions. For example, the NEF 552 may translate between an AF-Service-Identifier and an internal 5GC information. NEF 552 may also receive information from other NFs based on exposed capabilities of other NFs. This information may be stored at the NEF 552 as structured data, or at a data storage NF using standardized interfaces. The stored information can then be re-exposed by the NEF 552 to other NFs and AFs, or used for other purposes such as analytics.

The NRF 554 supports service discovery functions, receives NF discovery requests from NF instances, and provides information of the discovered NF instances to the requesting NF instances. NRF 554 also maintains information of available NF instances and their supported services. The NRF 554 also supports service discovery functions, wherein the NRF 554 receives NF Discovery Request from NF instance or an SCP (not shown), and provides information of the discovered NF instances to the NF instance or SCP.

The PCF 556 provides policy rules to control plane functions to enforce them, and may also support unified policy framework to govern network behavior. The PCF 556 may also implement a front end to access subscription information relevant for policy decisions in a UDR of the UDM 558. In addition to communicating with functions over reference points as shown, the PCF 556 exhibit an Npcf service-based interface.

The UDM 558 handles subscription-related information to support the network entities' handling of communication sessions, and stores subscription data of UE 502. For example, subscription data may be communicated via an N8 reference point between the UDM 558 and the AMF 544. The UDM 558 may include two parts, an application front end and a UDR. The UDR may store subscription data and policy data for the UDM 558 and the PCF 556, and/or structured data for exposure and application data (including PFDs for application detection, application request information for multiple UEs 502) for the NEF 552. The Nudr service-based interface may be exhibited by the UDR 221 to allow the UDM 558, PCF 556, and NEF 552 to access a particular set of the stored data, as well as to read, update (e.g., add, modify), delete, and subscribe to notification of relevant data changes in the UDR. The UDM may include a UDM-FE, which is in charge of processing credentials, location management, subscription management and so on. Several different front ends may serve the same user in different transactions. The UDM-FE accesses subscription information stored in the UDR and performs authentication credential processing, user identification handling, access authorization, registration/mobility management, and subscription management. In addition to communicating with other NFs over reference points as shown, the UDM 558 may exhibit the Nudm service-based interface.

AF 560 provides application influence on traffic routing, provide access to NEF 552, and interact with the policy framework for policy control. The AF 560 may influence UPF 548 (*re*) selection and traffic routing. Based on operator deployment, when AF 560 is considered to be a trusted entity, the network operator may permit AF 560 to interact directly with relevant NFs. Additionally, the AF 560 may be used for edge computing implementations.

The 5GC 540 may enable edge computing by selecting operator/3rd party services to be geographically close to a point that the UE 502 is attached to the network. This may reduce latency and load on the network. In edge computing implementations, the 5GC 540 may select a UPF 548 close to the UE 502 and execute traffic steering from the UPF 548 to DN 536 via the N6 interface. This may be based on the UE subscription data, UE location, and information provided by the AF 560, which allows the AF 560 to influence UPF (re) selection and traffic routing.

The data network (DN) 536 may represent various network operator services, Internet access, or third party services that may be provided by one or more servers including, for example, application (app)/content server 538. The DN 536 may be an operator external public, a private PDN, or an intra-operator packet data network, for example, for provision of IMS services. In this embodiment, the app server 538 can be coupled to an IMS via an S-CSCF or the I-CSCF. In some implementations, the DN 536 may represent one or more local area DNS (LADNs), which are DNs 536 (or DN names (DNNs)) that is/are accessible by a UE 502 in one or more specific areas. Outside of these specific areas, the UE 502 is not able to access the LADN/DN 536.

Additionally or alternatively, the DN 536 may be an Edge DN 536, which is a (local) Data Network that supports the architecture for enabling edge applications. In these embodiments, the app server 538 may represent the physical hardware systems/devices providing app server functionality and/or the application software resident in the cloud or at an edge compute node that performs server function(s). In some embodiments, the app/content server 538 provides an edge hosting environment that provides support required for Edge Application Server's execution.

In some embodiments, the 5GS can use one or more edge compute nodes to provide an interface and offload processing of wireless communication traffic. In these embodiments, the edge compute nodes may be included in, or co-located with one or more RAN 510, 514. For example, the edge compute nodes can provide a connection between the RAN 514 and UPF 548 in the 5GC 540. The edge compute nodes can use one or more NFV instances instantiated on virtualization infrastructure within the edge compute nodes to process wireless connections to and from the RAN 514 and UPF 548.

The interfaces of the 5GC 540 include reference points and service-based interfaces. The reference points include: N1 (between the UE 502 and the AMF 544), N2 (between RAN 514 and AMF 544), N3 (between RAN 514 and UPF 548), N4 (between the SMF 546 and UPF 548), N5 (between PCF 556 and AF 560), N6 (between UPF 548 and DN 536), N7 (between SMF 546 and PCF 556), N8 (between UDM 558 and AMF 544), N9 (between two UPFs 548), N10 (between the UDM 558 and the SMF 546), N11 (between the AMF 544 and the SMF 546), N12 (between AUSF 542 and AMF 544), N13 (between AUSF 542 and UDM 558), N14 (between two AMFs 544; not shown), N15 (between PCF 556 and AMF 544 in case of a non-roaming scenario, or between the PCF 556 in a visited network and AMF 544 in case of a roaming scenario), N16 (between two SMFs 546; not shown), and N22 (between AMF 544 and NSSF 550). Other reference point representations not shown in FIG. 5 can also be used. The service-based representation of FIG. 5 represents NFs within the control plane that enable other authorized NFs to access their services. The service-based interfaces (SBIs) include: Namf (SBI exhibited by AMF 544), Nsmf (SBI exhibited by SMF 546), Nnef (SBI exhibited by NEF 552), Npcf (SBI exhibited by PCF 556), Nudm (SBI exhibited by the UDM 558), Naf (SBI exhibited by AF 560), Nnrf (SBI exhibited by NRF 554), Nnssf (SBI exhibited by NSSF 550), Nausf (SBI exhibited by AUSF 542). Other service-based interfaces (e.g., Nudr, N5g-eir, and Nudsf) not shown in FIG. 5 can also be used. In some embodiments, the NEF 552 can provide an interface to edge compute nodes 536*x*, which can be used to process wireless connections with the RAN 514. In some implementations, the system 500 may include an SMSF, which is responsible for SMS subscription checking and verification, and relaying SM messages to/from the UE 502 to/from other entities, such as an SMS-GMSC/IWMSC/SMS-router. The SMS may also interact with AMF 544 and UDM 558 for a notification procedure that the UE 502 is available for SMS transfer (e.g., set a UE not reachable flag, and notifying UDM 558 when UE 502 is available for SMS).

The 5GS may also include an SCP (or individual instances of the SCP) that supports indirect communication (see e.g., 3GPP TS 23.501 section 7.1.1); delegated discovery (see e.g., 3GPP TS 23.501 section 7.1.1); message forwarding and routing to destination NF/NF service(s), communication security (e.g., authorization of the NF Service Consumer to access the NF Service Producer API) (see e.g., 3GPP TS 33.501), load balancing, monitoring, overload control, etc.; and discovery and selection functionality for UDM(s), AUSF(s), UDR(s), PCF(s) with access to subscription data stored in the UDR based on UE's SUPI, SUCI or GPSI (see e.g., 3GPP TS 23.501 section 6.3). Load balancing, monitoring, overload control functionality provided by the SCP may be implementation specific. The SCP may be deployed in a distributed manner. More than one SCP can be present in the communication path between various NF Services. The SCP, although not an NF instance, can also be deployed distributed, redundant, and scalable.

FIG. 6 schematically illustrates a wireless network 600 in accordance with various embodiments. The wireless network 600 may include a UE 602 in wireless communication with an AN 604. The UE 602 and AN 604 may be similar to, and substantially interchangeable with, like-named components described with respect to FIG. 5.

The UE 602 may be communicatively coupled with the AN 604 via connection 606. The connection 606 is illustrated as an air interface to enable communicative coupling, and can be consistent with cellular communications protocols such as an LTE protocol or a 5G NR protocol operating at mmWave or sub-6 GHZ frequencies.

The UE 602 may include a host platform 608 coupled with a modem platform 610. The host platform 608 may include application processing circuitry 612, which may be coupled with protocol processing circuitry 614 of the modem platform 610. The application processing circuitry 612 may run various applications for the UE 602 that source/sink application data. The application processing circuitry 612 may further implement one or more layer operations to transmit/receive application data to/from a data network. These layer operations may include transport (for example UDP) and Internet (for example, IP) operations.

The protocol processing circuitry 614 may implement one or more of layer operations to facilitate transmission or reception of data over the connection 606. The layer operations implemented by the protocol processing circuitry 614 may include, for example, MAC, RLC, PDCP, RRC and NAS operations.

The modem platform 610 may further include digital baseband circuitry 616 that may implement one or more layer operations that are "below" layer operations performed by the protocol processing circuitry 614 in a network protocol stack. These operations may include, for example, PHY operations including one or more of HARQ acknowledgement (ACK) functions, scrambling/descrambling, encoding/decoding, layer mapping/de-mapping, modulation symbol mapping, received symbol/bit metric determination, multi-antenna port precoding/decoding, which may include one or more of space-time, space-frequency or spatial coding, reference signal generation/detection, preamble sequence generation and/or decoding, synchronization sequence generation/detection, control channel signal blind decoding, and other related functions.

The modem platform 610 may further include transmit circuitry 618, receive circuitry 620, RF circuitry 622, and RF front end (RFFE) 624, which may include or connect to one or more antenna panels 626. Briefly, the transmit circuitry 618 may include a digital-to-analog converter, mixer, intermediate frequency (IF) components, etc.; the receive circuitry 620 may include an analog-to-digital converter, mixer, IF components, etc.; the RF circuitry 622 may include a low-noise amplifier, a power amplifier, power tracking components, etc.; RFFE 624 may include filters (for example, surface/bulk acoustic wave filters), switches, antenna tuners, beamforming components (for example, phase-array antenna components), etc. The selection and arrangement of the components of the transmit circuitry 618, receive circuitry 620, RF circuitry 622, RFFE 624, and antenna panels 626 (referred generically as "transmit/receive components") may be specific to details of a specific implementation such as, for example, whether communication is TDM or FDM, in mmWave or sub-6 gHz frequencies, etc. In some embodiments, the transmit/receive components may be arranged in multiple parallel transmit/receive chains, may be disposed in the same or different chips/modules, etc.

In some embodiments, the protocol processing circuitry 614 may include one or more instances of control circuitry (not shown) to provide control functions for the transmit/receive components.

A UE 602 reception may be established by and via the antenna panels 626, RFFE 624, RF circuitry 622, receive circuitry 620, digital baseband circuitry 616, and protocol processing circuitry 614. In some embodiments, the antenna panels 626 may receive a transmission from the AN 604 by receive-beamforming signals received by a plurality of antennas/antenna elements of the one or more antenna panels 626.

A UE 602 transmission may be established by and via the protocol processing circuitry 614, digital baseband circuitry 616, transmit circuitry 618, RF circuitry 622, RFFE 624, and antenna panels 626. In some embodiments, the transmit components of the UE 604 may apply a spatial filter to the data to be transmitted to form a transmit beam emitted by the antenna elements of the antenna panels 626.

Similar to the UE 602, the AN 604 may include a host platform 628 coupled with a modem platform 630. The host platform 628 may include application processing circuitry 632 coupled with protocol processing circuitry 634 of the modem platform 630. The modem platform may further include digital baseband circuitry 636, transmit circuitry 638, receive circuitry 640, RF circuitry 642, RFFE circuitry 644, and antenna panels 646. The components of the AN 604 may be similar to and substantially interchangeable with like-named components of the UE 602. In addition to performing data transmission/reception as described above, the components of the AN 608 may perform various logical functions that include, for example, RNC functions such as radio bearer management, uplink and downlink dynamic radio resource management, and data packet scheduling.

Figure 7:
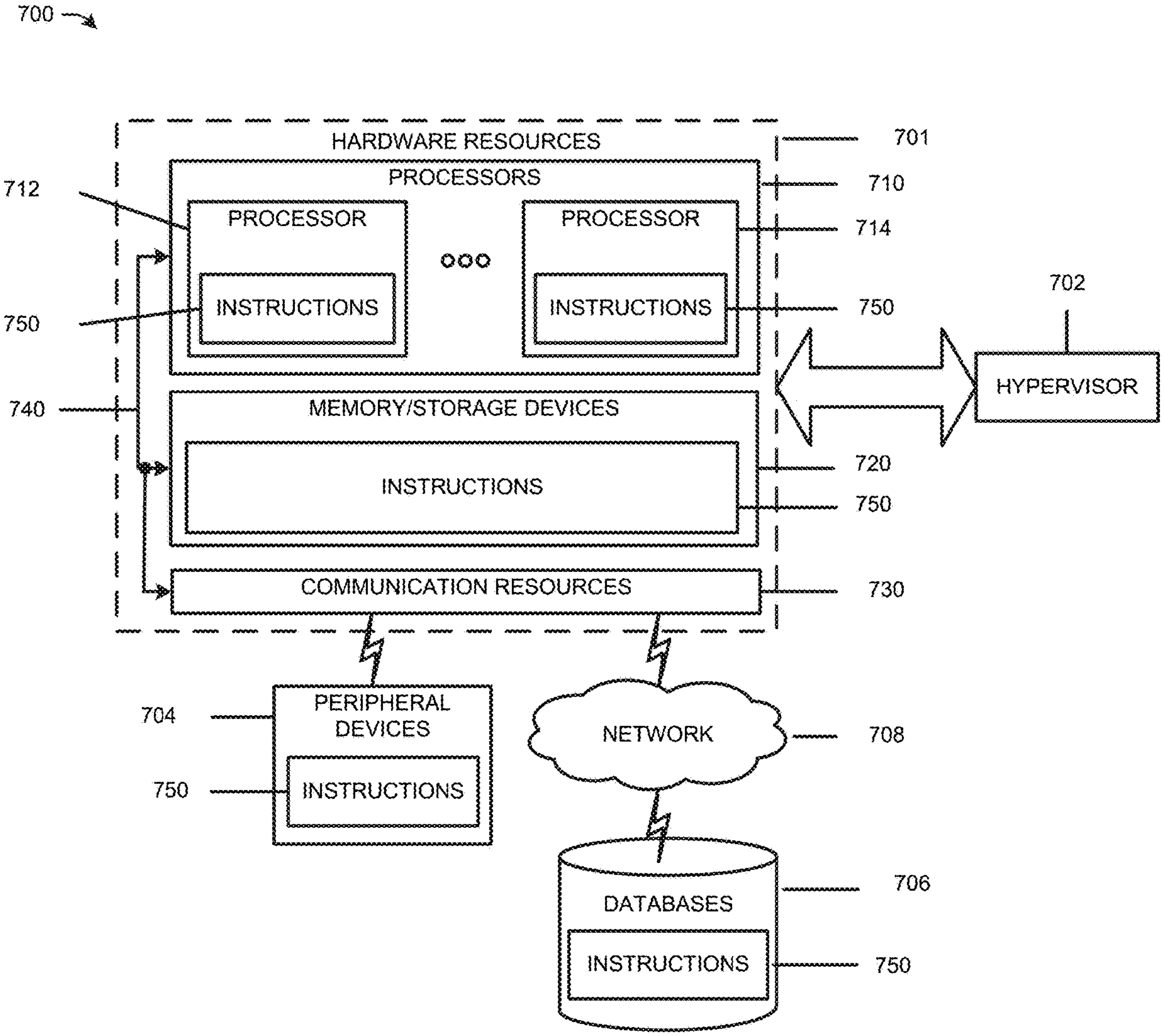
FIG. 7 illustrates components of a computing device, in accordance with one or more example embodiments of the present disclosure.

FIG. 7 illustrates components of a computing device 700 according to some example embodiments, able to read instructions from a machine-readable or computer-readable medium (e.g., a non-transitory machine-readable storage medium) and perform any one or more of the methodologies discussed herein. Specifically, FIG. 7 shows a diagrammatic representation of hardware resources 701 including one or more processors (or processor cores) 710, one or more memory/storage devices 720, and one or more communication resources 730, each of which may be communicatively coupled via a bus 740 or other interface circuitry. For embodiments where node virtualization (e.g., NFV) is utilized, a hypervisor 702 may be executed to provide an execution environment for one or more network slices/sub-slices to utilize the hardware resources 701.

The processors 710 include, for example, processor 712 and processor 714. The processors 710 include circuitry such as, but not limited to one or more processor cores and one or more of cache memory, low drop-out voltage regulators (LDOs), interrupt controllers, serial interfaces such as SPI, 12C or universal programmable serial interface circuit, real time clock (RTC), timer-counters including interval and watchdog timers, general purpose I/O, memory card controllers such as secure digital/multi-media card (SD/MMC) or similar, interfaces, mobile industry processor interface (MIPI) interfaces and Joint Test Access Group (JTAG) test access ports. The processors 710 may be, for example, a central processing unit (CPU), reduced instruction set computing (RISC) processors, Acorn RISC Machine (ARM) processors, complex instruction set computing (CISC) processors, graphics processing units (GPUs), one or more Digital Signal Processors (DSPs) such as a baseband processor, Application-Specific Integrated Circuits (ASICs), an Field-Programmable Gate Array (FPGA), a radio-frequency integrated circuit (RFIC), one or more microprocessors or controllers, another processor (including those discussed herein), or any suitable combination thereof. In some implementations, the processor circuitry 710 may include one or more hardware accelerators, which may be microprocessors, programmable processing devices (e.g., FPGA, complex programmable logic devices (CPLDs), etc.), or the like.

The memory/storage devices 720 may include main memory, disk storage, or any suitable combination thereof. The memory/storage devices 720 may include, but are not limited to, any type of volatile, non-volatile, or semi-volatile memory such as random access memory (RAM), dynamic RAM (DRAM), static RAM (SRAM), synchronous DRAM (SDRAM), erasable programmable read-only memory (EPROM), electrically erasable programmable read-only memory (EEPROM), Flash memory, solid-state storage, phase change RAM (PRAM), resistive memory such as magnetoresistive random access memory (MRAM), etc., and may incorporate three-dimensional (3D) cross-point (XPOINT) memories from Intel® and Micron®. The memory/storage devices 720 may also comprise persistent storage devices, which may be temporal and/or persistent storage of any type, including, but not limited to, non-volatile memory, optical, magnetic, and/or solid state mass storage, and so forth.

The communication resources 730 may include interconnection or network interface controllers, components, or other suitable devices to communicate with one or more peripheral devices 704 or one or more databases 706 or other network elements via a network 708. For example, the communication resources 730 may include wired communication components (e.g., for coupling via USB, Ethernet, Ethernet, Ethernet over GRE Tunnels, Ethernet over Multiprotocol Label Switching (MPLS), Ethernet over USB, Controller Area Network (CAN), Local Interconnect Network (LIN), DeviceNet, ControlNet, Data Highway+, PROFIBUS, or PROFINET, among many others), cellular communication components, NFC components, Bluetooth® (or Bluetooth® Low Energy) components, WiFi® components, and other communication components. Network connectivity may be provided to/from the computing device 700 via the communication resources 730 using a physical connection, which may be electrical (e.g., a "copper interconnect") or optical. The physical connection also includes suitable input connectors (e.g., ports, receptacles, sockets, etc.) and output connectors (e.g., plugs, pins, etc.). The communication resources 730 may include one or more dedicated processors and/or FPGAs to communicate using one or more of the aforementioned network interface protocols.

Instructions 750 may comprise software, a program, an application, an applet, an app, or other executable code for causing at least any of the processors 710 to perform any one or more of the methodologies discussed herein. The instructions 750 may reside, completely or partially, within at least one of the processors 710 (e.g., within the processor's cache memory), the memory/storage devices 720, or any suitable combination thereof. Furthermore, any portion of the instructions 750 may be transferred to the hardware resources 701 from any combination of the peripheral devices 704 or the databases 706. Accordingly, the memory of processors 710, the memory/storage devices 720, the peripheral devices 704, and the databases 706 are examples of computer-readable and machine-readable media.

Figure 8:
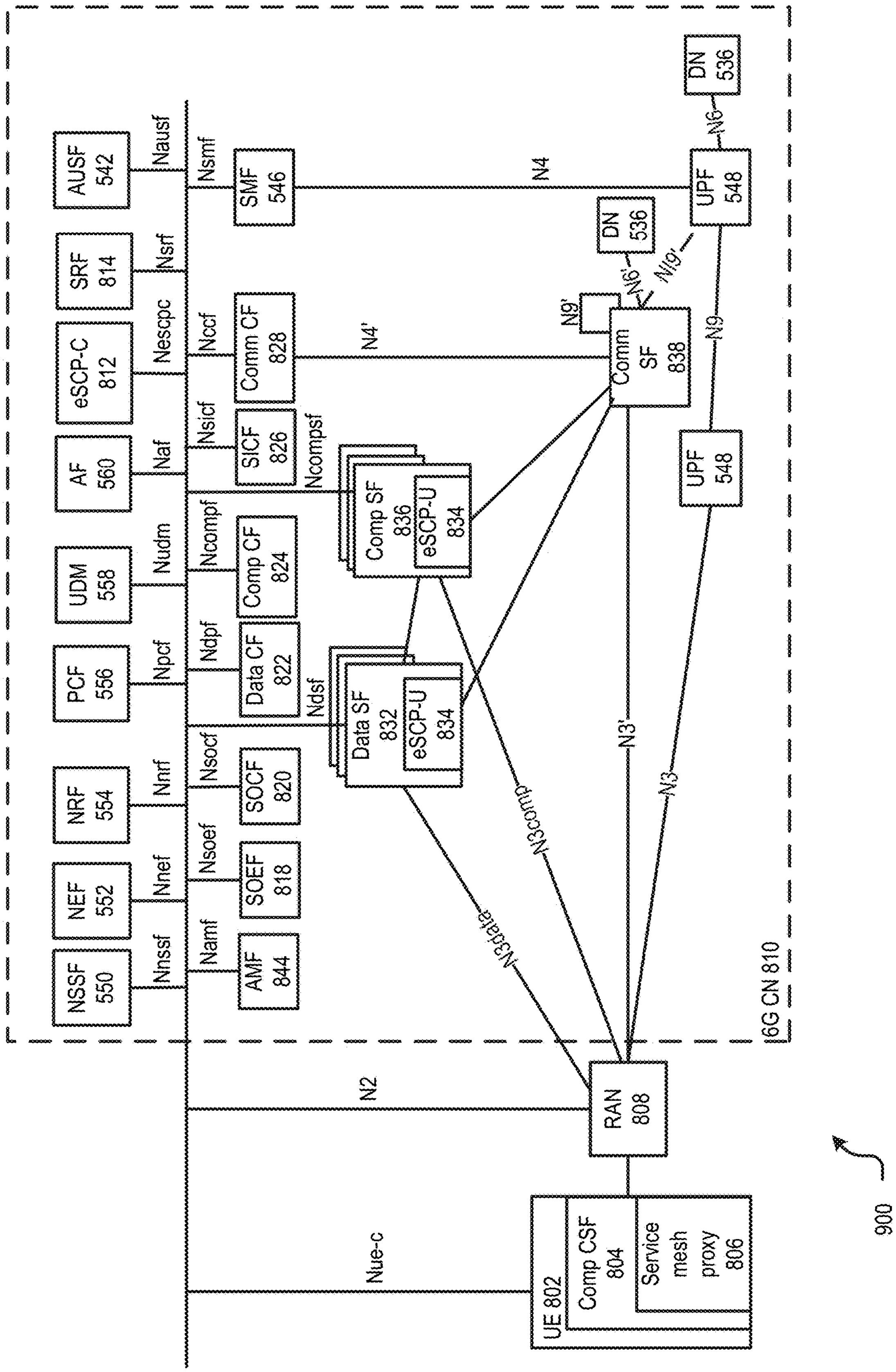
FIG. 8 illustrates a network in accordance with various embodiments.

FIG. 8 illustrates a network 800 in accordance with various embodiments. The network 800 may operate in a matter consistent with 3GPP technical specifications or technical reports for 6G systems. In some embodiments, the network 800 may operate concurrently with network 500. For example, in some embodiments, the network 800 may share one or more frequency or bandwidth resources with network 500. As one specific example, a UE (e.g., UE 802) may be configured to operate in both network 800 and network 500. Such configuration may be based on a UE including circuitry configured for communication with frequency and bandwidth resources of both networks 500 and 800. In general, several elements of network 800 may share one or more characteristics with elements of network 500. For the sake of brevity and clarity, such elements may not be repeated in the description of network 800.

The network 800 may include a UE 802, which may include any mobile or non-mobile computing device designed to communicate with a RAN 808 via an over-the-air connection. The UE 802 may be similar to, for example, UE 502. The UE 802 may be, but is not limited to, a smartphone, tablet computer, wearable computer device, desktop computer, laptop computer, in-vehicle infotainment, in-car entertainment device, instrument cluster, head-up display device, onboard diagnostic device, dashtop mobile equipment, mobile data terminal, electronic engine management system, electronic/engine control unit, electronic/engine control module, embedded system, sensor, microcontroller, control module, engine management system, networked appliance, machine-type communication device, M2M or D2D device, IoT device, etc.

Although not specifically shown in FIG. 8, in some embodiments the network 800 may include a plurality of UEs coupled directly with one another via a sidelink interface. The UEs may be M2M/D2D devices that communicate using physical sidelink channels such as, but not limited to, PSBCH, PSDCH, PSSCH, PSCCH, PSFCH, etc. Similarly, although not specifically shown in FIG. 8, the UE 802 may be communicatively coupled with an AP such as AP 506 as described with respect to FIG. 5. Additionally, although not specifically shown in FIG. 8, in some embodiments the RAN 808 may include one or more ANss such as AN 508 as described with respect to FIG. 5. The RAN 808 and/or the AN of the RAN 808 may be referred to as a base station (BS), a RAN node, or using some other term or name.

The UE 802 and the RAN 808 may be configured to communicate via an air interface that may be referred to as a sixth generation (6G) air interface. The 6G air interface may include one or more features such as communication in a terahertz (THz) or sub-THz bandwidth, or joint communication and sensing. As used herein, the term "joint communication and sensing" may refer to a system that allows for wireless communication as well as radar-based sensing via various types of multiplexing. As used herein, THz or sub-THz bandwidths may refer to communication in the 80 GHz and above frequency ranges. Such frequency ranges may additionally or alternatively be referred to as "millimeter wave" or "mmWave" frequency ranges.

The RAN 808 may allow for communication between the UE 802 and a 6G core network (CN) 810. Specifically, the RAN 808 may facilitate the transmission and reception of data between the UE 802 and the 6G CN 810. The 6G CN 810 may include various functions such as NSSF 550, NEF 552, NRF 554, PCF 556, UDM 558, AF 560, SMF 546, and AUSF 542. The 6G CN 810 may additional include UPF 548 and DN 536 as shown in FIG. 8.

Additionally, the RAN 808 may include various additional functions that are in addition to, or alternative to, functions of a legacy cellular network such as a 4G or 5G network. Two such functions may include a Compute Control Function (Comp CF) 824 and a Compute Service Function (Comp SF) 836. The Comp CF 824 and the Comp SF 836 may be parts or functions of the Computing Service Plane. Comp CF 824 may be a control plane function that provides functionalities such as management of the Comp SF 836, computing task context generation and management (e.g., create, read, modify, delete), interaction with the underlaying computing infrastructure for computing resource management, etc. Comp SF 836 may be a user plane function that serves as the gateway to interface computing service users (such as UE 802) and computing nodes behind a Comp SF instance. Some functionalities of the Comp SF 836 may include: parse computing service data received from users to compute tasks executable by computing nodes; hold service mesh ingress gateway or service API gateway; service and charging policies enforcement; performance monitoring and telemetry collection, etc. In some embodiments, a Comp SF 836 instance may serve as the user plane gateway for a cluster of computing nodes. A Comp CF 824 instance may control one or more Comp SF 836 instances.

Two other such functions may include a Communication Control Function (Comm CF) 828 and a Communication Service Function (Comm SF) 838, which may be parts of the Communication Service Plane. The Comm CF 828 may be the control plane function for managing the Comm SF 838, communication sessions creation/configuration/releasing, and managing communication session context. The Comm SF 838 may be a user plane function for data transport. Comm CF 828 and Comm SF 838 may be considered as upgrades of SMF 546 and UPF 548, which were described with respect to a 5G system in FIG. 5. The upgrades provided by the Comm CF 828 and the Comm SF 838 may enable service-aware transport. For legacy (e.g., 4G or 5G) data transport, SMF 546 and UPF 548 may still be used.

Two other such functions may include a Data Control Function (Data CF) 822 and Data Service Function (Data SF) 832 may be parts of the Data Service Plane. Data CF 822 may be a control plane function and provides functionalities such as Data SF 832 management, Data service creation/configuration/releasing, Data service context management, etc. Data SF 832 may be a user plane function and serve as the gateway between data service users (such as UE 802 and the various functions of the 6G CN 810) and data service endpoints behind the gateway. Specific functionalities may include: parse data service user data and forward to corresponding data service endpoints, generate charging data, report data service status.

Another such function may be the Service Orchestration and Chaining Function (SOCF) 820, which may discover, orchestrate and chain up communication/computing/data services provided by functions in the network. Upon receiving service requests from users, SOCF 820 may interact with one or more of Comp CF 824, Comm CF 828, and Data CF 822 to identify Comp SF 836, Comm SF 838, and Data SF 832 instances, configure service resources, and generate the service chain, which could contain multiple Comp SF 836, Comm SF 838, and Data SF 832 instances and their associated computing endpoints. Workload processing and data movement may then be conducted within the generated service chain. The SOCF 820 may also responsible for maintaining, updating, and releasing a created service chain.

Another such function may be the service registration function (SRF) 814, which may act as a registry for system services provided in the user plane such as services provided by service endpoints behind Comp SF 836 and Data SF 832 gateways and services provided by the UE 802. The SRF 814 may be considered a counterpart of NRF 554, which may act as the registry for network functions.

Other such functions may include an evolved service communication proxy (eSCP) and service infrastructure control function (SICF) 826, which may provide service communication infrastructure for control plane services and user plane services. The eSCP may be related to the service communication proxy (SCP) of 5G with user plane service communication proxy capabilities being added. The eSCP is therefore expressed in two parts: eCSP-C 812 and eSCP-U 834, for control plane service communication proxy and user plane service communication proxy, respectively. The SICF 826 may control and configure eCSP instances in terms of service traffic routing policies, access rules, load balancing configurations, performance monitoring, etc.

Another such function is the AMF 844. The AMF 844 may be similar to 544, but with additional functionality.

Specifically, the AMF 844 may include potential functional repartition, such as move the message forwarding functionality from the AMF 844 to the RAN 808.

Another such function is the service orchestration exposure function (SOEF) 818. The SOEF may be configured to expose service orchestration and chaining services to external users such as applications.

The UE 802 may include an additional function that is referred to as a computing client service function (comp CSF) 804. The comp CSF 804 may have both the control plane functionalities and user plane functionalities, and may interact with corresponding network side functions such as SOCF 820, Comp CF 824, Comp SF 836, Data CF 822, and/or Data SF 832 for service discovery, request/response, compute task workload exchange, etc. The Comp CSF 804 may also work with network side functions to decide on whether a computing task should be run on the UE 802, the RAN 808, and/or an element of the 6G CN 810.

The UE 802 and/or the Comp CSF 804 may include a service mesh proxy 806. The service mesh proxy 806 may act as a proxy for service-to-service communication in the user plane. Capabilities of the service mesh proxy 806 may include one or more of addressing, security, load balancing, etc.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

Additional examples of the presently described embodiments include the following, non-limiting implementations. Each of the following non-limiting examples may stand on its own or may be combined in any permutation or combination with any one or more of the other examples provided below or throughout the present disclosure.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below.

The following examples pertain to further embodiments.

Example 1 may include an apparatus comprising transmit a request for sensing services to a network, the request including one or more parameters related to sensing; receive an authorization response from the network based on a UE's subscription status and privacy settings; execute sensing functions locally on the UE upon receiving authorization from the network; transmit sensing data to the network for exposure to authorized clients; and update a UE's privacy profile related to sensing data via a communication with a network function.

Example 2 may include the apparatus of example 1 and/or some other example herein, wherein the processing circuitry may be further configured to verify privacy settings with a User Data Management (UDM) system before transmitting sensing data to the network.

Example 3 may include the apparatus of example 2 and/or some other example herein, wherein the processing circuitry may be further configured to decline sending sensing data if the privacy settings do not allow sharing of the data with any external network entities.

Example 4 may include the apparatus of example 1 and/or some other example herein, wherein the processing circuitry may be further configured to transmit an enrollment request to a network function or Application Function (AF) for initiating a sensing session after receiving authorization from the network.

Example 5 may include the apparatus of example 1 and/or some other example herein, wherein the processing circuitry may be further configured to receive a notification from the network indicating whether the sensing data can be exposed to a peer UE based on locally configured privacy settings.

Example 6 may include the apparatus of example 1 and/or some other example herein, wherein the processing circuitry may be further configured to disable access to the sensing data by unauthorized network clients or Application Functions (AFs).

Example 7 may include the apparatus of example 1 and/or some other example herein, wherein the processing circuitry may be further configured to update a sensing privacy profile via an N1 NAS message transmitted to the network, allowing dynamic changes to its privacy settings.

Example 8 may include the apparatus of example 7 and/or some other example herein, wherein the processing circuitry may be further configured to initiate a sensing service session by verifying the sensing privacy profile of a peer UE before transmitting any sensing-related data to the peer UE.

Example 9 may include the apparatus of example 6 and/or some other example herein, wherein the processing circuitry may be further configured to receive updates from the network regarding any changes to the sensing privacy profile and apply those updates dynamically.

Example 10 may include the apparatus of example 1 and/or some other example herein, wherein the processing circuitry may be further configured to communicate with a privacy management system to enforce global privacy parameters that control whether the sensing data can be shared based on predefined privacy classes.

Example 11 may include a computer-readable medium storing computer-executable instructions which when executed by one or more processors result in performing operations comprising: transmitting a request for sensing services to a network, the request including one or more parameters related to sensing; receiving an authorization response from the network based on a UE's subscription status and privacy settings; executing sensing functions locally on the UE upon receiving authorization from the network; transmitting sensing data to the network for exposure to authorized clients; and updating a UE's privacy profile related to sensing data via a communication with a network function.

Example 12 may include the computer-readable medium of example 11 and/or some other example herein, wherein the operations further comprise verify privacy settings with a User Data Management (UDM) system before transmitting sensing data to the network.

Example 13 may include the computer-readable medium of example 12 and/or some other example herein, wherein the operations further comprise decline sending sensing data if the privacy settings do not allow sharing of the data with any external network entities.

Example 14 may include the computer-readable medium of example 11 and/or some other example herein, wherein the operations further comprise transmitting an enrollment request to a network function or Application Function (AF) for initiating a sensing session after receiving authorization from the network.

Example 15 may include the computer-readable medium of example 11 and/or some other example herein, wherein the operations further comprise receiving a notification from the network indicating whether the sensing data can be exposed to a peer UE based on locally configured privacy settings.

Example 16 may include the computer-readable medium of example 11 and/or some other example herein, wherein the operations further comprise disable access to the sensing data by unauthorized network clients or Application Functions (AFs).

Example 17 may include the computer-readable medium of example 11 and/or some other example herein, wherein the operations further comprise updating a sensing privacy profile via an N1 NAS message transmitted to the network, allowing dynamic changes to its privacy settings.

Example 18 may include the computer-readable medium of example 17 and/or some other example herein, wherein the operations further comprise initiating a sensing service session by verifying the sensing privacy profile of a peer UE before transmitting any sensing-related data to the peer UE.

Example 19 may include the computer-readable medium of example 16 and/or some other example herein, wherein the operations further comprise receiving updates from the network regarding any changes to the sensing privacy profile and apply those updates dynamically.

Example 20 may include the computer-readable medium of example 11 and/or some other example herein, wherein the operations further comprise communicate with a privacy management system to enforce global privacy parameters that control whether the sensing data can be shared based on predefined privacy classes.

Example 21 may include a method comprising: transmitting a request for sensing services to a network, the request including one or more parameters related to sensing; receiving an authorization response from the network based on a UE's subscription status and privacy settings; executing sensing functions locally on the UE upon receiving authorization from the network; transmitting sensing data to the network for exposure to authorized clients; and updating a UE's privacy profile related to sensing data via a communication with a network function.

Example 22 may include the method of example 21 and/or some other example herein, further comprising verify privacy settings with a User Data Management (UDM) system before transmitting sensing data to the network.

Example 23 may include the method of example 22 and/or some other example herein, further comprising decline sending sensing data if the privacy settings do not allow sharing of the data with any external network entities.

Example 24 may include the method of example 21 and/or some other example herein, further comprising transmitting an enrollment request to a network function or Application Function (AF) for initiating a sensing session after receiving authorization from the network.

Example 25 may include the method of example 21 and/or some other example herein, further comprising receiving a notification from the network indicating whether the sensing data can be exposed to a peer UE based on locally configured privacy settings.

Example 26 may include the method of example 21 and/or some other example herein, further comprising disable access to the sensing data by unauthorized network clients or Application Functions (AFs).

Example 27 may include the method of example 21 and/or some other example herein, further comprising updating a sensing privacy profile via an N1 NAS message transmitted to the network, allowing dynamic changes to its privacy settings.

Example 28 may include the method of example 27 and/or some other example herein, further comprising initiating a sensing service session by verifying the sensing privacy profile of a peer UE before transmitting any sensing-related data to the peer UE.

Example 29 may include the method of example 26 and/or some other example herein, further comprising receiving updates from the network regarding any changes to the sensing privacy profile and apply those updates dynamically.

Example 30 may include the method of example 21 and/or some other example herein, further comprising communicate with a privacy management system to enforce global privacy parameters that control whether the sensing data can be shared based on predefined privacy classes.

Example 31 may include an apparatus comprising means for: transmitting a request for sensing services to a network, the request including one or more parameters related to sensing; receiving an authorization response from the network based on a UE's subscription status and privacy settings; executing sensing functions locally on the UE upon receiving authorization from the network; transmitting sensing data to the network for exposure to authorized clients; and updating a UE's privacy profile related to sensing data via a communication with a network function.

Example 32 may include the apparatus of example 31 and/or some other example herein, further comprising verify privacy settings with a User Data Management (UDM) system before transmitting sensing data to the network.

Example 33 may include the apparatus of example 32 and/or some other example herein, further comprising decline sending sensing data if the privacy settings do not allow sharing of the data with any external network entities.

Example 34 may include the apparatus of example 31 and/or some other example herein, further comprising transmitting an enrollment request to a network function or Application Function (AF) for initiating a sensing session after receiving authorization from the network.

Example 35 may include the apparatus of example 31 and/or some other example herein, further comprising receiving a notification from the network indicating whether the sensing data can be exposed to a peer UE based on locally configured privacy settings.

Example 36 may include the apparatus of example 31 and/or some other example herein, further comprising disable access to the sensing data by unauthorized network clients or Application Functions (AFs).

Example 37 may include the apparatus of example 31 and/or some other example herein, further comprising updating a sensing privacy profile via an N1 NAS message transmitted to the network, allowing dynamic changes to its privacy settings.

Example 38 may include the apparatus of example 37 and/or some other example herein, further comprising initiating a sensing service session by verifying the sensing privacy profile of a peer UE before transmitting any sensing-related data to the peer UE.

Example 39 may include the apparatus of example 36 and/or some other example herein, further comprising receiving updates from the network regarding any changes to the sensing privacy profile and apply those updates dynamically.

Example 40 may include the apparatus of example 31 and/or some other example herein, further comprising communicate with a privacy management system to enforce global privacy parameters that control whether the sensing data can be shared based on predefined privacy classes.

Example 41 may include an apparatus comprising means for performing any of the methods of examples 1-40.

Example 42 may include a network node comprising a communication interface and processing circuitry connected thereto and configured to perform the methods of examples 1-40.

Example 43 may include an apparatus comprising means to perform one or more elements of a method described in or related to any of examples 1-40, or any other method or process described herein.

Example 44 may include one or more non-transitory computer-readable media comprising instructions to cause an electronic device, upon execution of the instructions by one or more processors of the electronic device, to perform one or more elements of a method described in or related to any of examples 1-40, or any other method or process described herein.

Example 45 may include an apparatus comprising logic, modules, or circuitry to perform one or more elements of a method described in or related to any of examples 1-40, or any other method or process described herein.

Example 46 may include a method, technique, or process as described in or related to any of examples 1-40, or portions or parts thereof.

Example 47 may include an apparatus comprising: one or more processors and one or more computer-readable media comprising instructions that, when executed by the one or more processors, cause the one or more processors to perform the method, techniques, or process as described in or related to any of examples 1-40, or portions thereof.

Example 48 may include a signal as described in or related to any of examples 1-40, or portions or parts thereof.

Example 49 may include a datagram, packet, frame, segment, protocol data unit (PDU), or message as described in or related to any of examples 1-40, or portions or parts thereof, or otherwise described in the present disclosure.

Example 50 may include a signal encoded with data as described in or related to any of examples 1-40, or portions or parts thereof, or otherwise described in the present disclosure.

Example 51 may include a signal encoded with a datagram, packet, frame, segment, protocol data unit (PDU), or message as described in or related to any of examples 1-40, or portions or parts thereof, or otherwise described in the present disclosure.

Example 52 may include an electromagnetic signal carrying computer-readable instructions, wherein execution of the computer-readable instructions by one or more processors is to cause the one or more processors to perform the method, techniques, or process as described in or related to any of examples 1-40, or portions thereof.

Example 53 may include a computer program comprising instructions, wherein execution of the program by a processing element is to cause the processing element to carry out the method, techniques, or process as described in or related to any of examples 1-40, or portions thereof.

Example 54 may include a signal in a wireless network as shown and described herein.

Example 55 may include a method of communicating in a wireless network as shown and described herein.

Example 56 may include a system for providing wireless communication as shown and described herein.

Example 57 may include a device for providing wireless communication as shown and described herein.

An example implementation is an edge computing system, including respective edge processing devices and nodes to invoke or perform the operations of the examples above, or other subject matter described herein. Another example implementation is a client endpoint node, operable to invoke or perform the operations of the examples above, or other subject matter described herein. Another example implementation is an aggregation node, network hub node, gateway node, or core data processing node, within or coupled to an edge computing system, operable to invoke or perform the operations of the examples above, or other subject matter described herein. Another example implementation is an access point, base station, road-side unit, street-side unit, or on-premise unit, within or coupled to an edge computing system, operable to invoke or perform the operations of the examples above, or other subject matter described herein. Another example implementation is an edge provisioning node, service orchestration node, application orchestration node, or multi-tenant management node, within or coupled to an edge computing system, operable to invoke or perform the operations of the examples above, or other subject matter described herein. Another example implementation is an edge node operating an edge provisioning service, application or service orchestration service, virtual machine deployment, container deployment, function deployment, and compute management, within or coupled to an edge computing system, operable to invoke or perform the operations of the examples above, or other subject matter described herein. Another example implementation is an edge computing system operable as an edge mesh, as an edge mesh with side car loading, or with mesh-to-mesh communications, operable to invoke or perform the operations of the examples above, or other subject matter described herein. Another example implementation is an edge computing system including aspects of network functions, acceleration functions, acceleration hardware, storage hardware, or computation hardware resources, operable to invoke or perform the use cases discussed herein, with use of the examples above, or other subject matter described herein. Another example implementation is an edge computing system adapted for supporting client mobility, vehicle-to-vehicle (V2V), vehicle-to-everything (V2X), or vehicle-to-infrastructure (V2I) scenarios, and optionally operating according to ETSI MEC specifications, operable to invoke or perform the use cases discussed herein, with use of the examples above, or other subject matter described herein. Another example implementation is an edge computing system adapted for mobile wireless communications, including configurations according to an 3GPP 4G/LTE or 5G network capabilities, operable to invoke or perform the use cases discussed herein, with use of the examples above, or other subject matter described herein. Another example implementation is a computing system adapted for network communications, including configurations according to an O-RAN capabilities, operable to invoke or perform the use cases discussed herein, with use of the examples above, or other subject matter described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

TERMINOLOGY

The terminology used herein is for the purpose of describing particular embodiments only and is not intended to be limiting of the disclosure. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "In some embodiments," which may each refer to one or more of the same or different embodiments. Furthermore, the terms "comprising," "including," "having," and the like, as used with respect to embodiments of the present disclosure, are synonymous.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or ink, and/or the like.

The term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, and/or transferring digital data. Processing circuitry may include one or more processing cores to execute instructions and one or more memory structures to store program and data information. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. Processing circuitry may include more hardware accelerators, which may be microprocessors, programmable processing devices, or the like. The one or more hardware accelerators may include, for example, computer vision (CV) and/or deep learning (DL) accelerators. The terms "application circuitry" and/or "baseband circuitry" may be considered synonymous to, and may be referred to as, "processor circuitry."

The term "memory" and/or "memory circuitry" as used herein refers to one or more hardware devices for storing data, including RAM, MRAM, PRAM, DRAM, and/or SDRAM, core memory, ROM, magnetic disk storage mediums, optical storage mediums, flash memory devices or other machine readable mediums for storing data. The term "computer-readable medium" may include, but is not limited to, memory, portable or fixed storage devices, optical storage devices, and various other mediums capable of storing, containing or carrying instructions or data.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource. The term "element" refers to a unit that is indivisible at a given level of abstraction and has a clearly defined boundary, wherein an element may be any type of entity including, for example, one or more devices, systems, controllers, network elements, modules, etc., or combinations thereof. The term "device" refers to a physical entity embedded inside, or attached to, another physical entity in its vicinity, with capabilities to convey digital information from or to that physical entity. The term "entity" refers to a distinct component of an architecture or device, or information transferred as a payload. The term "controller" refers to an element or entity that has the capability to affect a physical entity, such as by changing its state or causing the physical entity to move.

The term "cloud computing" or "cloud" refers to a paradigm for enabling network access to a scalable and elastic pool of shareable computing resources with self-service provisioning and administration on-demand and without active management by users. Cloud computing provides cloud computing services (or cloud services), which are one or more capabilities offered via cloud computing that are invoked using a defined interface (e.g., an API or the like). The term "computing resource" or simply "resource" refers to any physical or virtual component, or usage of such components, of limited availability within a computer system or network. Examples of computing resources include usage/access to, for a period of time, servers, processor(s), storage equipment, memory devices, memory areas, networks, electrical power, input/output (peripheral) devices, mechanical devices, network connections (e.g., channels/links, ports, network sockets, etc.), operating systems, virtual machines (VMs), software/applications, computer files, and/or the like. A "hardware resource" may refer to compute, storage, and/or network resources provided by physical hardware element(s). A "virtualized resource" may refer to compute, storage, and/or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable. As used herein, the term "cloud service provider" (or CSP) indicates an organization which operates typically large-scale "cloud" resources comprised of centralized, regional, and edge data centers (e.g., as used in the context of the public cloud). In other examples, a CSP may also be referred to as a Cloud Service Operator (CSO). References to "cloud computing" generally refer to computing resources and services offered by a CSP or a CSO, at remote locations with at least some increased latency, distance, or constraints relative to edge computing.

As used herein, the term "data center" refers to a purpose-designed structure that is intended to house multiple high-performance compute and data storage nodes such that a large amount of compute, data storage and network resources are present at a single location. This often entails specialized rack and enclosure systems, suitable heating, cooling, ventilation, security, fire suppression, and power delivery systems. The term may also refer to a compute and data storage node in some contexts. A data center may vary in scale between a centralized or cloud data center (e.g., largest), regional data center, and edge data center (e.g., smallest).

As used herein, the term "edge computing" refers to the implementation, coordination, and use of computing and resources at locations closer to the "edge" or collection of "edges" of a network. Deploying computing resources at the network's edge may reduce application and network latency, reduce network backhaul traffic and associated energy consumption, improve service capabilities, improve compliance with security or data privacy requirements (especially as compared to conventional cloud computing), and improve total cost of ownership). As used herein, the term "edge compute node" refers to a real-world, logical, or virtualized implementation of a compute-capable element in the form of a device, gateway, bridge, system or subsystem, component, whether operating in a server, client, endpoint, or peer mode, and whether located at an "edge" of an network or at a connected location further within the network. References to a "node" used herein are generally interchangeable with a "device", "component", and "subsystem"; however, references to an "edge computing system" or "edge computing network" generally refer to a distributed architecture, organization, or collection of multiple nodes and devices, and which is organized to accomplish or offer some aspect of services or resources in an edge computing setting.

Additionally or alternatively, the term "Edge Computing" refers to a concept, as described in [6], that enables operator and 3rd party services to be hosted close to the UE's access point of attachment, to achieve an efficient service delivery through the reduced end-to-end latency and load on the transport network. As used herein, the term "Edge Computing Service Provider" refers to a mobile network operator or a 3rd party service provider offering Edge Computing service. As used herein, the term "Edge Data Network" refers to a local Data Network (DN) that supports the architecture for enabling edge applications. As used herein, the term "Edge Hosting Environment" refers to an environment providing support required for Edge Application Server's execution. As used herein, the term "Application Server" refers to application software resident in the cloud performing the server function.

The term "Internet of Things" or "IoT" refers to a system of interrelated computing devices, mechanical and digital machines capable of transferring data with little or no human interaction, and may involve technologies such as real-time analytics, machine learning and/or AI, embedded systems, wireless sensor networks, control systems, automation (e.g., smarthome, smart building and/or smart city technologies), and the like. IoT devices are usually low-power devices without heavy compute or storage capabilities. "Edge IoT devices" may be any kind of IoT devices deployed at a network's edge.

As used herein, the term "cluster" refers to a set or grouping of entities as part of an edge computing system (or systems), in the form of physical entities (e.g., different computing systems, networks or network groups), logical entities (e.g., applications, functions, security constructs, containers), and the like. In some locations, a "cluster" is also referred to as a "group" or a "domain". The membership of cluster may be modified or affected based on conditions or functions, including from dynamic or property-based membership, from network or system management scenarios, or from various example techniques discussed below which may add, modify, or remove an entity in a cluster. Clusters may also include or be associated with multiple layers, levels, or properties, including variations in security features and results based on such layers, levels, or properties.

The term "application" may refer to a complete and deployable package, environment to achieve a certain function in an operational environment. The term "AI/ML application" or the like may be an application that contains some AI/ML models and application-level descriptions. The term "machine learning" or "ML" refers to the use of computer systems implementing algorithms and/or statistical models to perform specific task(s) without using explicit instructions, but instead relying on patterns and inferences. ML algorithms build or estimate mathematical model(s) (referred to as "ML models" or the like) based on sample data (referred to as "training data," "model training information," or the like) in order to make predictions or decisions without being explicitly programmed to perform such tasks. Generally, an ML algorithm is a computer program that learns from experience with respect to some task and some performance measure, and an ML model may be any object or data structure created after an ML algorithm is trained with one or more training datasets. After training, an ML model may be used to make predictions on new datasets. Although the term "ML algorithm" refers to different concepts than the term "ML model," these terms as discussed herein may be used interchangeably for the purposes of the present disclosure.

The term "machine learning model," "ML model," or the like may also refer to ML methods and concepts used by an ML-assisted solution. An "ML-assisted solution" is a solution that addresses a specific use case using ML algorithms during operation. ML models include supervised learning (e.g., linear regression, k-nearest neighbor (KNN), decision tree algorithms, support machine vectors, Bayesian algorithm, ensemble algorithms, etc.) unsupervised learning (e.g., K-means clustering, principle component analysis (PCA), etc.), reinforcement learning (e.g., Q-learning, multi-armed bandit learning, deep RL, etc.), neural networks, and the like. Depending on the implementation a specific ML model could have many sub-models as components and the ML model may train all sub-models together. Separately trained ML models can also be chained together in an ML pipeline during inference. An "ML pipeline" is a set of functionalities, functions, or functional entities specific for an ML-assisted solution; an ML pipeline may include one or several data sources in a data pipeline, a model training pipeline, a model evaluation pipeline, and an actor. The "actor" is an entity that hosts an ML assisted solution using the output of the ML model inference). The term "ML training host" refers to an entity, such as a network function, that hosts the training of the model. The term "ML inference host" refers to an entity, such as a network function, that hosts model during inference mode (which includes both the model execution as well as any online learning if applicable). The ML-host informs the actor about the output of the ML algorithm, and the actor takes a decision for an action (an "action" is performed by an actor as a result of the output of an ML assisted solution). The term "model inference information" refers to information used as an input to the ML model for determining inference(s); the data used to train an ML model and the data used to determine inferences may overlap, however, "training data" and "inference data" refer to different concepts.

The terms "instantiate," "instantiation," and the like as used herein refers to the creation of an instance. An "instance" also refers to a concrete occurrence of an object, which may occur, for example, during execution of program code. The term "information element" refers to a structural element containing one or more fields. The term "field" refers to individual contents of an information element, or a data element that contains content. As used herein, a "database object", "data structure", or the like may refer to any representation of information that is in the form of an object, attribute-value pair (AVP), key-value pair (KVP), tuple, etc., and may include variables, data structures, functions, methods, classes, database records, database fields, database entities, associations between data and/or database entities (also referred to as a "relation"), blocks and links between blocks in block chain implementations, and/or the like.

An "information object," as used herein, refers to a collection of structured data and/or any representation of information, and may include, for example electronic documents (or "documents"), database objects, data structures, files, audio data, video data, raw data, archive files, application packages, and/or any other like representation of information. The terms "electronic document" or "document," may refer to a data structure, computer file, or resource used to record data, and includes various file types and/or data formats such as word processing documents, spreadsheets, slide presentations, multimedia items, webpage and/or source code documents, and/or the like. As examples, the information objects may include markup and/or source code documents such as HTML, XML, JSON, Apex®, CSS, JSP, MessagePack™, Apache® Thrift™, ASN.1, Google® Protocol Buffers (protobuf), or some other document(s)/format(s) such as those discussed herein. An information object may have both a logical and a physical structure. Physically, an information object comprises one or more units called entities. An entity is a unit of storage that contains content and is identified by a name. An entity may refer to other entities to cause their inclusion in the information object. An information object begins in a document entity, which is also referred to as a root element (or "root"). Logically, an information object comprises one or more declarations, elements, comments, character references, and processing instructions, all of which are indicated in the information object (e.g., using markup).

The term "data item" as used herein refers to an atomic state of a particular object with at least one specific property at a certain point in time. Such an object is usually identified by an object name or object identifier, and properties of such an object are usually defined as database objects (e.g., fields, records, etc.), object instances, or data elements (e.g., markup language elements/tags, etc.). Additionally or alternatively, the term "data item" as used herein may refer to data elements and/or content items, although these terms may refer to difference concepts. The term "data element" or "element" as used herein refers to a unit that is indivisible at a given level of abstraction and has a clearly defined boundary. A data element is a logical component of an information object (e.g., electronic document) that may begin with a start tag (e.g., “<element>”) and end with a matching end tag (e.g., “</element>”), or only has an empty element tag (e.g., “<element/>”). Any characters between the start tag and end tag, if any, are the element’s content (referred to herein as “content items” or the like).

The content of an entity may include one or more content items, each of which has an associated datatype representation. A content item may include, for example, attribute values, character values, URIs, qualified names (qnames), parameters, and the like. A qname is a fully qualified name of an element, attribute, or identifier in an information object. A qname associates a URI of a namespace with a local name of an element, attribute, or identifier in that namespace. To make this association, the qname assigns a prefix to the local name that corresponds to its namespace. The qname comprises a URI of the namespace, the prefix, and the local name. Namespaces are used to provide uniquely named elements and attributes in information objects. Content items may include text content (e.g., “<element>content item</element>”), attributes (e.g., “<element attribute=” attribute Value “>”), and other elements referred to as “child elements” (e.g., “<element1><element2>content item</element2></element1>”). An “attribute” may refer to a markup construct including a name-value pair that exists within a start tag or empty element tag. Attributes contain data related to its element and/or control the element’s behavior.

The term “resource” as used herein refers to a physical or virtual device, a physical or virtual component within a computing environment, and/or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, and/or the like. A “hardware resource” may refer to compute, storage, and/or network resources provided by physical hardware element(s). A “virtualized resource” may refer to compute, storage, and/or network resources provided by virtualization infrastructure to an application, device, system, etc. The term “network resource” or “communication resource” may refer to resources that are accessible by computer devices/systems via a communications network. The term “system resources” may refer to any kind of shared entities to provide services, and may include computing and/or network resources. System resources may be considered as a set of coherent functions, network data objects or services, accessible through a server where such system resources reside on a single host or multiple hosts and are clearly identifiable. The term “channel” as used herein refers to any transmission medium, either tangible or intangible, which is used to communicate data or a data stream. The term “channel” may be synonymous with and/or equivalent to “communications channel,” “data communications channel,” “transmission channel,” “data transmission channel,” “access channel,” “data access channel,” “link,” “data link,” “carrier,” “radiofrequency carrier,” and/or any other like term denoting a pathway or medium through which data is communicated. Additionally, the term “link” as used herein refers to a connection between two devices through a RAT for the purpose of transmitting and receiving information. As used herein, the term “radio technology” refers to technology for wireless transmission and/or reception of electromagnetic radiation for information transfer. The term “radio access technology” or “RAT” refers to the technology used for the underlying physical connection to a radio based communication network. As used herein, the term “communication protocol” (either wired or wireless) refers to a set of standardized rules or instructions implemented by a communication device and/or system to communicate with other devices and/or systems, including instructions for packetizing/depacketizing data, modulating/demodulating signals, implementation of protocols stacks, and/or the like.

As used herein, the term “radio technology” refers to technology for wireless transmission and/or reception of electromagnetic radiation for information transfer. The term “radio access technology” or “RAT” refers to the technology used for the underlying physical connection to a radio based communication network. As used herein, the term “communication protocol” (either wired or wireless) refers to a set of standardized rules or instructions implemented by a communication device and/or system to communicate with other devices and/or systems, including instructions for packetizing/depacketizing data, modulating/demodulating signals, implementation of protocols stacks, and/or the like. Examples of wireless communications protocols may be used in various embodiments include a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology including, for example, 3GPP Fifth Generation (5G) or New Radio (NR), Universal Mobile Telecommunications System (UMTS), Freedom of Multimedia Access (FOMA), Long Term Evolution (LTE), LTE-Advanced (LTE Advanced), LTE Extra, LTE-A Pro, cdmaOne (2G), Code Division Multiple Access 2000 (CDMA 2000), Cellular Digital Packet Data (CDPD), Mobitex, Circuit Switched Data (CSD), High-Speed CSD (HSCSD), Universal Mobile Telecommunications System (UMTS), Wideband Code Division Multiple Access (W-CDM), High Speed Packet Access (HSPA), HSPA Plus (HSPA+), Time Division-Code Division Multiple Access (TD-CDMA), Time Division-Synchronous Code Division Multiple Access (TD-SCDMA), LTE LAA, MuLTEfire, UMTS Terrestrial Radio Access (UTRA), Evolved UTRA (E-UTRA), Evolution-Data Optimized or Evolution-Data Only (EV-DO), Advanced Mobile Phone System (AMPS), Digital AMPS (D-AMPS), Total Access Communication System/Extended Total Access Communication System (TACS/ETACS), Push-to-talk (PTT), Mobile Telephone System (MTS), Improved Mobile Telephone System (IMTS), Advanced Mobile Telephone System (AMTS), Cellular Digital Packet Data (CDPD), DataTAC, Integrated Digital Enhanced Network (iDEN), Personal Digital Cellular (PDC), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Bluetooth®, Bluetooth Low Energy (BLE), IEEE 802.15.4 based protocols (e.g., IPv6 over Low power Wireless Personal Area Networks (6LoWPAN), WirelessHART, MiWi, Thread, 802.11a, etc.) WiFi-direct, ANT/ANT+, ZigBee, Z-Wave, 3GPP device-to-device (D2D) or Proximity Services (ProSe), Universal Plug and Play (UPnP), Low-Power Wide-Area-Network (LPWAN), Long Range Wide Area Network (LoRA) or LoRaWAN™ developed by Semtech and the LoRa Alliance, Sigfox, Wireless Gigabit Alliance (WiGig) standard, Worldwide Interoperability for Microwave Access (WiMAX), mmWave standards in general (e.g., wireless systems operating at 10-300 GHz and above such as WiGig, IEEE 802.11ad, IEEE 802.11ay, etc.), V2X communication technologies (including 3GPP C-V2X), Dedicated Short Range Communications (DSRC) communication systems such as Intelligent-Transport-Systems (ITS) including the European ITS-G5, ITS-G5B, ITS-G5C, etc. In addition to the standards listed above, any number of satellite uplink technologies may be used for purposes of the present disclosure including, for example, radios compliant with standards issued by the International Telecommunication Union (ITU), or the European Telecommunications Standards Institute (ETSI), among others. The examples provided herein are thus understood as being applicable to various other communication technologies, both existing and not yet formulated.

The term "access network" refers to any network, using any combination of radio technologies, RATs, and/or communication protocols, used to connect user devices and service providers. In the context of WLANs, an "access network" is an IEEE 802 local area network (LAN) or metropolitan area network (MAN) between terminals and access routers connecting to provider services. The term "access router" refers to router that terminates a medium access control (MAC) service from terminals and forwards user traffic to information servers according to Internet Protocol (IP) addresses.

The term "SMTC" refers to an SSB-based measurement timing configuration configured by SSB-MeasurementTimingConfiguration. The term "SSB" refers to a synchronization signal/Physical Broadcast Channel (SS/PBCH) block, which includes a Primary Synchronization Signal (PSS), a Secondary Synchronization Signal (SSS), and a PBCH. The term "a "Primary Cell" refers to the MCG cell, operating on the primary frequency, in which the UE either performs the initial connection establishment procedure or initiates the connection re-establishment procedure. The term "Primary SCG Cell" refers to the SCG cell in which the UE performs random access when performing the Reconfiguration with Sync procedure for DC operation. The term "Secondary Cell" refers to a cell providing additional radio resources on top of a Special Cell for a UE configured with CA. The term "Secondary Cell Group" refers to the subset of serving cells comprising the PSCell and zero or more secondary cells for a UE configured with DC. The term "Serving Cell" refers to the primary cell for a UE in RRC_CONNECTED not configured with CA/DC there is only one serving cell comprising of the primary cell. The term "serving cell" or "serving cells" refers to the set of cells comprising the Special Cell(s) and all secondary cells for a UE in RRC_CONNECTED configured with CA. The term "Special Cell" refers to the PCell of the MCG or the PSCell of the SCG for DC operation; otherwise, the term "Special Cell" refers to the Pcell.

The term "A1 policy" refers to a type of declarative policies expressed using formal statements that enable the non-RT RIC function in the SMO to guide the near-RT RIC function, and hence the RAN, towards better fulfilment of the RAN intent.

The term "A1 Enrichment information" refers to information utilized by near-RT RIC that is collected or derived at SMO/non-RT RIC either from non-network data sources or from network functions themselves.

The term "A1-Policy Based Traffic Steering Process Mode" refers to an operational mode in which the Near-RT RIC is configured through A1 Policy to use Traffic Steering Actions to ensure a more specific notion of network performance (for example, applying to smaller groups of E2 Nodes and UEs in the RAN) than that which it ensures in the Background Traffic Steering.

The term "Background Traffic Steering Processing Mode" refers to an operational mode in which the Near-RT RIC is configured through O1 to use Traffic Steering Actions to ensure a general background network performance which applies broadly across E2 Nodes and UEs in the RAN.

The term "Baseline RAN Behavior" refers to the default RAN behavior as configured at the E2 Nodes by SMO The term "E2" refers to an interface connecting the Near-RT RIC and one or more O-CU-CPs, one or more O-CU-UPs, one or more O-DUs, and one or more O-eNBs.

The term "E2 Node" refers to a logical node terminating E2 interface. In this version of the specification, ORAN nodes terminating E2 interface are: for NR access: O-CU-CP, O-CU-UP, O-DU or any combination; and for E-UTRA access: O-eNB.

The term "Intents", in the context of O-RAN systems/implementations, refers to declarative policy to steer or guide the behavior of RAN functions, allowing the RAN function to calculate the optimal result to achieve stated objective.

The term "O-RAN non-real-time RAN Intelligent Controller" or "non-RT RIC" refers to a logical function that enables non-real-time control and optimization of RAN elements and resources, AI/ML workflow including model training and updates, and policy-based guidance of applications/features in Near-RT RIC.

The term "Near-RT RIC" or "O-RAN near-real-time RAN Intelligent Controller" refers to a logical function that enables near-real-time control and optimization of RAN elements and resources via fine-grained (e.g., UE basis, Cell basis) data collection and actions over E2 interface.

The term "O-RAN Central Unit" or "O-CU" refers to a logical node hosting RRC, SDAP and PDCP protocols.

The term "O-RAN Central Unit-Control Plane" or "O-CU-CP" refers to a logical node hosting the RRC and the control plane part of the PDCP protocol.

The term "O-RAN Central Unit-User Plane" or "O-CU-UP" refers to a logical node hosting the user plane part of the PDCP protocol and the SDAP protocol.

The term "O-RAN Distributed Unit" or "O-DU" refers to a logical node hosting RLC/MAC/High-PHY layers based on a lower layer functional split.

The term "O-RAN eNB" or "O-eNB" refers to an eNB or ng-eNB that supports E2 interface.

The term "O-RAN Radio Unit" or "O-RU" refers to a logical node hosting Low-PHY layer and RF processing based on a lower layer functional split. This is similar to 3GPP's "TRP" or "RRH" but more specific in including the Low-PHY layer (FFT/iFFT, PRACH extraction).

The term "O1" refers to an interface between orchestration & management entities (Orchestration/NMS) and O-RAN managed elements, for operation and management, by which FCAPS management, Software management, File management and other similar functions shall be achieved.

The term "RAN UE Group" refers to an aggregations of UEs whose grouping is set in the E2 nodes through E2 procedures also based on the scope of A1 policies. These groups can then be the target of E2 CONTROL or POLICY messages.

The term "Traffic Steering Action" refers to the use of a mechanism to alter RAN behavior. Such actions include E2 procedures such as CONTROL and POLICY.

The term "Traffic Steering Inner Loop" refers to the part of the Traffic Steering processing, triggered by the arrival of periodic TS related KPM (Key Performance Measurement) from E2 Node, which includes UE grouping, setting additional data collection from the RAN, as well as selection and execution of one or more optimization actions to enforce Traffic Steering policies.

The term "Traffic Steering Outer Loop" refers to the part of the Traffic Steering processing, triggered by the near-RT RIC setting up or updating Traffic Steering aware resource optimization procedure based on information from A1 Policy setup or update, A1 Enrichment Information (EI) and/or outcome of Near-RT RIC evaluation, which includes the initial configuration (preconditions) and injection of related A1 policies, Triggering conditions for TS changes.

The term "Traffic Steering Processing Mode" refers to an operational mode in which either the RAN or the Near-RT RIC is configured to ensure a particular network performance. This performance includes such aspects as cell load and throughput, and can apply differently to different E2 nodes and UEs. Throughout this process, Traffic Steering Actions are used to fulfill the requirements of this configuration.

The term "Traffic Steering Target" refers to the intended performance result that is desired from the network, which is configured to Near-RT RIC over O1.

Furthermore, any of the disclosed embodiments and example implementations can be embodied in the form of various types of hardware, software, firmware, middleware, or combinations thereof, including in the form of control logic, and using such hardware or software in a modular or integrated manner. Additionally, any of the software components or functions described herein can be implemented as software, program code, script, instructions, etc., operable to be executed by processor circuitry. These components, functions, programs, etc., can be developed using any suitable computer language such as, for example, Python, PyTorch, NumPy, Ruby, Ruby on Rails, Scala, Smalltalk, Java™, C++, C#, "C", Kotlin, Swift, Rust, Go (or "Golang"), EMCAScript, JavaScript, TypeScript, Jscript, ActionScript, Server-Side JavaScript (SSJS), PHP, Pearl, Lua, Torch/Lua with Just-In Time compiler (LuaJIT), Accelerated Mobile Pages Script (AMPscript), VBScript, JavaServer Pages (JSP), Active Server Pages (ASP), Node.js, ASP.NET, JAMscript, Hypertext Markup Language (HTML), extensible HTML (XHTML), Extensible Markup Language (XML), XML User Interface Language (XUL), Scalable Vector Graphics (SVG), RESTful API Modeling Language (RAML), wiki markup or Wikitext, Wireless Markup Language (WML), Java Script Object Notion (JSON), Apache® MessagePack™, Cascading Stylesheets (CSS), extensible stylesheet language (XSL), Mustache template language, Handlebars template language, Guide Template Language (GTL), Apache® Thrift, Abstract Syntax Notation One (ASN.1), Google® Protocol Buffers (protobuf), Bitcoin Script, EVM® bytecode, Solidity™, Vyper (Python derived), Bamboo, Lisp Like Language (LLL), Simplicity provided by Blockstream™, Rholang, Michelson, Counterfactual, Plasma, Plutus, Sophia, Salesforce® Apex®, and/or any other programming language or development tools including proprietary programming languages and/or development tools. The software code can be stored as a computer- or processor-executable instructions or commands on a physical non-transitory computer-readable medium. Examples of suitable media include RAM, ROM, magnetic media such as a hard-drive or a floppy disk, or an optical medium such as a compact disk (CD) or DVD (digital versatile disk), flash memory, and the like, or any combination of such storage or transmission devices.

ABBREVIATIONS

Unless used differently herein, terms, definitions, and abbreviations may be consistent with terms, definitions, and abbreviations defined in 3GPP TR 21.905 v16.0.0 (2019-06). For the purposes of the present document, the following abbreviations may apply to the examples and embodiments discussed herein.

TABLE 1

Abbreviations:

| | | | | | |
|---|---|---|---|---|---|
| 3GPP | Third Generation Partnership Project | IBE | In-Band Emission | PUSCH | Physical Uplink Shared Channel |
| 4G | Fourth Generation | IEEE | Institute of Electrical and Electronics Engineers | QAM | Quadrature Amplitude Modulation |
| 5G | Fifth Generation | IEI | Information Element Identifier | QCI | QoS class of identifier |
| 5GC | 5G Core network | IEIDL | Information Element Identifier Data Length | QCL | Quasi co-location |
| AC | Application Client | IETF | Internet Engineering Task Force | QFI | QoS Flow ID, QoS Flow Identifier |
| ACK | Acknowledgement | IF | Infrastructure | QoS | Quality of Service |
| ACID | Application Client Identification | IM | Interference Measurement, Intermodulation, IP Multimedia | QPSK | Quadrature (Quaternary) Phase Shift Keying |
| AF | Application Function | IMC | IMS Credentials | QZSS | Quasi-Zenith Satellite System |
| AM | Acknowledged Mode | IMEI | International Mobile Equipment Identity | RA-RNTI | Random Access RNTI |
| AMBR | Aggregate Maximum Bit Rate | IMGI | International mobile group identity | RAB | Radio Access Bearer, Random Access Burst |
| AMF | Access and Mobility Management Function | IMPI | IP Multimedia Private Identity | RACH | Random Access Channel |
| AN | Access Network | IMPU | IP Multimedia PUblic identity | RADIUS | Remote Authentication Dial In User Service |
| ANR | Automatic Neighbour Relation | IMS | IP Multimedia Subsystem | RAN | Radio Access Network |
| AP | Application Protocol, Antenna Port, Access Point | IMSI | International Mobile Subscriber Identity | RAND | RANDom number (used for authentication) |

TABLE 1-continued

| Abbreviations: | | | | | |
|---|---|---|---|---|---|
| API | Application Programming Interface | IoT | Internet of Things | RAR | Random Access Response |
| APN | Access Point Name | IP | Internet Protocol | RAT | Radio Access Technology |
| ARP | Allocation and Retention Priority | Ipsec | IP Security, Internet Protocol Security | RAU | Routing Area Update |
| ARQ | Automatic Repeat Request | IP-CAN | IP-Connectivity Access Network | RB | Resource block, Radio Bearer |
| AS | Access Stratum | IP-M | IP Multicast | RBG | Resource block group |
| ASP | Application Service Provider | IPv4 | Internet Protocol Version 4 | REG | Resource Element Group |
| ASN.1 | Abstract Syntax Notation One | IPv6 | Internet Protocol Version 6 | Rel | Release |
| AUSF | Authentication Server Function | IR | Infrared | REQ | REQuest |
| AWGN | Additive White Gaussian Noise | IS | In Sync | RF | Radio Frequency |
| BAP | Backhaul Adaptation Protocol | IRP | Integration Reference Point | RI | Rank Indicator |
| BCH | Broadcast Channel | ISDN | Integrated Services Digital Network | RIV | Resource indicator value |
| BER | Bit Error Ratio | ISIM | IM Services Identity Module | RL | Radio Link |
| BFD | Beam Failure Detection | ISO | International Organisation for Standardisation | RLC | Radio Link Control, Radio Link Control layer |
| BLER | Block Error Rate | ISP | Internet Service Provider | RLC AM | RLC Acknowledged Mode |
| BPSK | Binary Phase Shift Keying | IWF | Interworking-Function | RLC UM | RLC Unacknowledged Mode |
| BRAS | Broadband Remote Access Server | I-WLAN | Interworking WLAN | RLF | Radio Link Failure |
| BSS | Business Support System | | Constraint length of the convolutional code, USIM Individual key | RLM | Radio Link Monitoring |
| BS | Base Station | kB | Kilobyte (1000 bytes) | RLM-RS | Reference Signal for RLM |
| BSR | Buffer Status Report | kbps | kilo-bits per second | RM | Registration Management |
| BW | Bandwidth | Kc | Ciphering key | RMC | Reference Measurement Channel |
| BWP | Bandwidth Part | Ki | Individual subscriber authentication key | RMSI | Remaining MSI, Remaining Minimum System Information |
| C-RNTI | Cell Radio Network Temporary Identity | KPI | Key Performance Indicator | RN | Relay Node |
| CA | Carrier Aggregation, Certification Authority | KQI | Key Quality Indicator | RNC | Radio Network Controller |
| CAPEX | CAPital EXpenditure | KSI | Key Set Identifier | RNL | Radio Network Layer |
| CBRA | Contention Based Random Access | ksps | kilo-symbols per second | RNTI | Radio Network Temporary Identifier |
| CC | Component Carrier, Country Code, Cryptographic Checksum | KVM | Kernel Virtual Machine | ROHC | RObust Header Compression |
| CCA | Clear Channel Assessment | L1 | Layer 1 (physical layer) | RRC | Radio Resource Control, Radio Resource Control layer |
| CCE | Control Channel Element | L1-RSRP | Layer 1 reference signal received power | RRM | Radio Resource Management |
| CCCH | Common Control Channel | L2 | Layer 2 (data link layer) | RS | Reference Signal |
| CE | Coverage Enhancement | L3 | Layer 3 (network layer) | RSRP | Reference Signal Received Power |
| CDM | Content Delivery Network | LAA | Licensed Assisted Access | RSRQ | Reference Signal Received Quality |
| CDMA | Code-Division Multiple Access | LAN | Local Area Network | RSSI | Received Signal Strength Indicator |
| CFRA | Contention Free Random Access | LADN | Local Area Data Network | RSU | Road Side Unit |
| CG | Cell Group | LBT | Listen Before Talk | RSTD | Reference Signal Time difference |
| CGF | Charging Gateway Function | LCM | LifeCycle Management | RTP | Real Time Protocol |
| CHF | Charging Function | LCR | Low Chip Rate | RTS | Ready-To-Send |
| CI | Cell Identity | LCS | Location Services | RTT | Round Trip Time |
| CID | Cell-ID (e.g., positioning method) | LCID | Logical Channel ID | Rx | Reception, Receiving, Receiver |
| CIM | Common Information Model | LI | Layer Indicator | S1AP | S1 Application Protocol |

TABLE 1-continued

Abbreviations:

| | | | | | |
|---|---|---|---|---|---|
| CIR | Carrier to Interference Ratio | LLC | Logical Link Control, Low Layer Compatibility | S1-MMES1 | for the control plane |
| CK | Cipher Key | LPLMN | Local PLMN | S1-U | S1 for the user plane |
| CM | Connection Management, Conditional Mandatory | LPP | LTE Positioning Protocol | S-GW | Serving Gateway |
| CMAS | Commercial Mobile Alert Service | LSB | Least Significant Bit | S-RNTI | SRNC Radio Network Temporary Identity |
| CMD | Command | LTE | Long Term Evolution | S-TMSI | SAE Temporary Mobile Station Identifier |
| CMS | Cloud Management System | LWA | LTE-WLAN aggregation | SA | Standalone operation mode |
| CO | Conditional Optional | LWIP | LTE/WLAN Radio Level Integration with IPsec Tunnel | SAE | System Architecture Evolution |
| CoMP | Coordinated Multi-Point | LTE | Long Term Evolution | SAP | Service Access Point |
| CORESET | Control Resource Set | M2M | Machine-to-Machine | SAPD | Service Access Point Descriptor |
| COTS | Commercial Off-The-Shelf | MAC | Medium Access Control (protocol layering context) | SAPI | Service Access Point Identifier |
| CP | Control Plane, Cyclic Prefix, Connection Point | MAC | Message authentication code (security/encryption context) | SCC | Secondary Component Carrier, Secondary CC |
| CPD | Connection Point Descriptor | MAC-A | MAC used for authentication and key agreement (TSG T WG3 context) | SCell | Secondary Cell |
| CPE | Customer Premise Equipment | MAC-I | MAC used for data integrity of signalling messages (TSG T WG3 context) | SCEF | Service Capability Exposure Function |
| CPICH | Common Pilot Channel | MANO | Management and Orchestration | SC-FDMA | Single Carrier Frequency Division Multiple Access |
| CQI | Channel Quality Indicator | MBMS | Multimedia Broadcast and Multicast Service | SCG | Secondary Cell Group |
| CPU | CSI processing unit, Central Processing Unit | MBSFN | Multimedia Broadcast multicast service Single Frequency Network | SCM | Security Context Management |
| C/R | Command/Response field bit | MCC | Mobile Country Code | SCS | Subcarrier Spacing |
| CRAN | Cloud Radio Access Network, Cloud RAN | MCG | Master Cell Group | SCTP | Stream Control Transmission Protocol |
| CRB | Common Resource Block | MCOT | Maximum Channel Occupancy Time | SDAP | Service Data Adaptation Protocol, Service Data Adaptation Protocol layer |
| CRC | Cyclic Redundancy Check | MCS | Modulation and coding scheme | SDL | Supplementary Downlink |
| CRI | Channel-State Information Resource Indicator, CSI-RS Resource Indicator | MDAF | Management Data Analytics Function | SDNF | Structured Data Storage Network Function |
| C-RNTI | Cell RNTI | MDAS | Management Data Analytics Service | SDP | Session Description Protocol |
| CS | Circuit Switched | MDT | Minimization of Drive Tests | SDSF | Structured Data Storage Function |
| CSAR | Cloud Service Archive | ME | Mobile Equipment | SDU | Service Data Unit |
| CSI | Channel-State Information | MeNB | master eNB | SEAF | Security Anchor Function |
| CSI-IM | CSI Interference Measurement | MER | Message Error Ratio | SeNB | secondary eNB |
| CSI-RS | CSI Reference Signal | MGL | Measurement Gap Length | SEPP | Security Edge Protection Proxy |
| CSI-RSRP | CSI reference signal received power | MGRP | Measurement Gap Repetition Period | SFI | Slot format indication |
| CSI-RSRQ | CSI reference signal received quality | MIB | Master Information Block, Management Information Base | SFTD | Space-Frequency Time Diversity, SFN and frame timing difference |
| CSI-SINR | CSI signal-to-noise and interference ratio | MIMO | Multiple Input Multiple Output | SFN | System Frame Number |
| CSMA | Carrier Sense Multiple Access | MLC | Mobile Location Centre | SgNB | Secondary gNB |
| CSMA/CA | CSMA with collision avoidance | MM | Mobility Management | SGSN | Serving GPRS Support Node |
| CSS | Common Search Space, Cell-specific Search Space | MME | Mobility Management Entity | S-GW | Serving Gateway |

TABLE 1-continued

| Abbreviations: | | | | | |
|---|---|---|---|---|---|
| CTF | Charging Trigger Function | MN | Master Node | SI | System Information |
| CTS | Clear-to-Send | MNO | Mobile Network Operator | SI-RNTI | System Information RNTI |
| CW | Codeword | MO | Measurement Object, Mobile Originated | SIB | System Information Block |
| CWS | Contention Window Size | MPBCH | MTC Physical Broadcast CHannel | SIM | Subscriber Identity Module |
| D2D | Device-to-Device | MPDCCH | MTC Physical Downlink Control CHannel | SIP | Session Initiated Protocol |
| DC | Dual Connectivity, Direct Current | MPDSCH | MTC Physical Downlink Shared CHannel | SiP | System in Package |
| DCI | Downlink Control Information | MPRACH | MTC Physical Random Access CHannel | SL | Sidelink |
| DF | Deployment Flavour | MPUSCH | MTC Physical Uplink Shared Channel | SLA | Service Level Agreement |
| DL | Downlink | MPLS | MultiProtocol Label Switching | SM | Session Management |
| DMTF | Distributed Management Task Force | MS | Mobile Station | SMF | Session Management Function |
| DPDK | Data Plane Development Kit | MSB | Most Significant Bit | SMS | Short Message Service |
| DM-RS, DMRS | Demodulation Reference Signal | MSC | Mobile Switching Centre | SMSF | SMS Function |
| DN | Data network | MSI | Minimum System Information, MCH Scheduling Information | SMTC | SSB-based Measurement Timing Configuration |
| DNN | Data Network Name | MSID | Mobile Station Identifier | SN | Secondary Node, Sequence Number |
| DNAI | Data Network Access Identifier | MSIN | Mobile Station Identification Number | SoC | System on Chip |
| DRB | Data Radio Bearer | MSISDN | Mobile Subscriber ISDN Number | SON | Self-Organizing Network |
| DRS | Discovery Reference Signal | MT | Mobile Terminated, Mobile Termination | SpCell | Special Cell |
| DRX | Discontinuous Reception | MTC | Machine-Type Communications | SP-CSI-RNTI | Semi-Persistent CSI RNTI |
| DSL | Domain Specific Language. Digital Subscriber Line | mMTC | massive MTC, massive Machine-Type Communications | SPS | Semi-Persistent Scheduling |
| DSLAM | DSL Access Multiplexer | MU-MIMO | Multi User MIMO | SQN | Sequence number |
| DwPTS | Downlink Pilot Time Slot | MWUS | MTC wake-up signal, MTC WUS | SR | Scheduling Request |
| E-LAN | Ethernet Local Area Network | NACK | Negative Acknowledgement | SRB | Signalling Radio Bearer |
| E2E | End-to-End | NAI | Network Access Identifier | SRS | Sounding Reference Signal |
| ECCA | extended clear channel assessment, extended CCA | NAS | Non-Access Stratum, Non-Access Stratum layer | SS | Synchronization Signal |
| ECCE | Enhanced Control Channel Element, Enhanced CCE | NCT | Network Connectivity Topology | SSB | Synchronization Signal Block |
| ED | Energy Detection | NC-JT | Non-Coherent Joint Transmission | SSID | Service Set Identifier |
| EDGE | Enhanced Datarates for GSM Evolution (GSM Evolution) | NEC | Network Capability Exposure | SS/PBCH Block | |
| EAS | Edge Application Server | NE-DC | NR-E-UTRA Dual Connectivity | SSBRI | SS/PBCH Block Resource Indicator, Synchronization Signal Block Resource Indicator |
| EASID | Edge Application Server Identification | NEF | Network Exposure Function | SSC | Session and Service Continuity |
| ECS | Edge Configuration Server | NF | Network Function | SS-RSRP | Synchronization Signal based Reference Signal Received Power |
| ECSP | Edge Computing Service Provider | NFP | Network Forwarding Path | SS-RSRQ | Synchronization Signal based Reference Signal Received Quality |
| EDN | Edge Data Network | NFPD | Network Forwarding Path Descriptor | SS-SINR | Synchronization Signal based Signal to Noise and Interference Ratio |
| EEC | Edge Enabler Client | NFV | Network Functions Virtualization | SSS | Secondary Synchronization Signal |
| EECID | Edge Enabler Client Identification | NFVI | NFV Infrastructure | SSSG | Search Space Set Group |

TABLE 1-continued

Abbreviations:

| | | | | | |
|---|---|---|---|---|---|
| EES | Edge Enabler Server | NFVO | NFV Orchestrator | SSSIF | Search Space Set Indicator |
| EESID | Edge Enabler Server Identification | NG | Next Generation, Next Gen | SST | Slice/Service Types |
| EHE | Edge Hosting Environment | NGEN-DC | NG-RAN E-UTRA-NR Dual Connectivity | SU-MIMO | Single User MIMO |
| EGMF | Exposure Governance tableManagement Function | NM | Network Manager | SUL | Supplementary Uplink |
| EGPRS | Enhanced GPRS | NMS | Network Management System | TA | Timing Advance, Tracking Area |
| EIR | Equipment Identity Register | N-PoP | Network Point of Presence | TAC | Tracking Area Code |
| eLAA | enhanced Licensed Assisted Access, enhanced LAA | NMIB, N-MIB | Narrowband MIB | TAG | Timing Advance Group |
| EM | Element Manager | NPBCH | Narrowband Physical Broadcast CHannel | TAI | Tracking Area Identity |
| eMBB | Enhanced Mobile Broadband | NPDCCH | Narrowband Physical Downlink Control CHannel | TAU | Tracking Area Update |
| EMS | Element Management System | NPDSCH | Narrowband Physical Downlink Shared CHannel | TB | Transport Block |
| eNB | evolved NodeB, E-UTRAN Node B | NPRACH | Narrowband Physical Random Access CHannel | TBS | Transport Block Size |
| EN-DC | E-UTRA-NR Dual Connectivity | NPUSCH | Narrowband Physical Uplink Shared CHannel | TBD | To Be Defined |
| EPC | Evolved Packet Core | NPSS | Narrowband Primary Synchronization Signal | TCI | Transmission Configuration Indicator |
| EPDCCH | enhanced PDCCH, enhanced Physical Downlink Control Cannel | NSSS | Narrowband Secondary Synchronization Signal | TCP | Transmission Communication Protocol |
| EPRE | Energy per resource element | NR | New Radio, Neighbour Relation | TDD | Time Division Duplex |
| EPS | Evolved Packet System | NRF | NF Repository Function | TDM | Time Division Multiplexing |
| EREG | enhanced REG, enhanced resource element groups | NRS | Narrowband Reference Signal | TDMA | Time Division Multiple Access |
| ETSI | European Telecommunications Standards Institute | NS | Network Service | TE | Terminal Equipment |
| ETWS | Earthquake and Tsunami Warning System | NSA | Non-Standalone operation mode | TEID | Tunnel End Point Identifier |
| eUICC | embedded UICC, embedded Universal Integrated Circuit Card | NSD | Network Service Descriptor | TFT | Traffic Flow Template |
| E-UTRA | Evolved UTRA | NSR | Network Service Record | TMSI | Temporary Mobile Subscriber Identity |
| E-UTRAN | Evolved UTRAN | NSSAI | Network Slice Selection Assistance Information | TNL | Transport Network Layer |
| EV2X | Enhanced V2X | S-NNSAI | Single-NSSAI | TPC | Transmit Power Control |
| F1AP | F1 Application Protocol | NSSF | Network Slice Selection Function | TPMI | Transmitted Precoding Matrix Indicator |
| F1-C | F1 Control plane interface | NW | Network | TR | Technical Report |
| F1-U | F1 User plane interface | NWUS | Narrowband wake-up signal, Narrowband WUS | TRP, TRxP | Transmission Reception Point |
| FACCH | Fast Associated Control CHannel | NZP | Non-Zero Power | TRS | Tracking Reference Signal |
| FACCH/F | Fast Associated Control Channel/Full rate | O&M | Operation and Maintenance | TRx | Transceiver |
| FACCH/H | Fast Associated Control Channel/Half rate | ODU2 | Optical channel Data Unit - type 2 | TS | Technical Specifications, Technical Standard |
| FACH | Forward Access Channel | OFDM | Orthogonal Frequency Division Multiplexing | TTI | Transmission Time Interval |
| FAUSCH | Fast Uplink Signalling Channel | OFDMA | Orthogonal Frequency Division Multiple Access | Tx | Transmission, Transmitting, Transmitter |
| FB | Functional Block | OOB | Out-of-band | U-RNTI | UTRAN Radio Network Temporary Identity |
| FBI | Feedback Information | OOS | Out of Sync | UART | Universal Asynchronous Receiver and Transmitter |
| FCC | Federal Communications Commission | OPEX | OPerating EXpense | UCI | Uplink Control Information |
| FCCH | Frequency Correction CHannel | OSI | Other System Information | UE | User Equipment |

TABLE 1-continued

| Abbreviations: | | | | | |
|---|---|---|---|---|---|
| FDD | Frequency Division Duplex | OSS | Operations Support System | UDM | Unified Data Management |
| FDM | Frequency Division Multiplex | OTA | over-the-air | UDP | User Datagram Protocol |
| FDMA | Frequency Division Multiple Access | PAPR | Peak-to-Average Power Ratio | UDSF | Unstructured Data Storage Network Function |
| FE | Front End | PAR | Peak to Average Ratio | UICC | Universal Integrated Circuit Card |
| FEC | Forward Error Correction | PBCH | Physical Broadcast Channel | UL | Uplink |
| FFS | For Further Study | PC | Power Control, Personal Computer | UM | Unacknowledged Mode |
| FFT | Fast Fourier Transformation | PCC | Primary Component Carrier, Primary CC | UML | Unified Modelling Language |
| feLAA | further enhanced Licensed Assisted Access, further enhanced LAA | PCell | Primary Cell | UMTS | Universal Mobile Telecommunications System |
| FN | Frame Number | PCI | Physical Cell ID, Physical Cell Identity | UP | User Plane |
| FPGA | Field-Programmable Gate Array | PCEF | Policy and Charging Enforcement Function | UPF | User Plane Function |
| FR | Frequency Range | PCF | Policy Control Function | URI | Uniform Resource Identifier |
| FQDN | Fully Qualified Domain Name | PCRF | Policy Control and Charging Rules Function | URL | Uniform Resource Locator |
| G-RNTI | GERAN Radio Network Temporary Identity | PDCP | Packet Data Convergence Protocol, Packet Data Convergence Protocol layer | URLLC | Ultra-Reliable and Low Latency |
| GERAN | GSM EDGE RAN, GSM EDGE Radio Access Network | PDCCH | Physical Downlink Control Channel | USB | Universal Serial Bus |
| GGSN | Gateway GPRS Support Node | PDCP | Packet Data Convergence Protocol | USIM | Universal Subscriber Identity Module |
| GLONASS | GLObal'naya NAvigatsionnaya Sputnikovaya Sistema (Engl.: Global Navigation Satellite System) | PDN | Packet Data Network, Public Data Network | USS | UE-specific search space |
| gNB | Next Generation NodeB | PDSCH | Physical Downlink Shared Channel | UTRA | UMTS Terrestrial Radio Access |
| gNB-CU | gNB-centralized unit, Next Generation NodeB centralized unit | PDU | Protocol Data Unit | UTRAN | Universal Terrestrial Radio Access Network |
| gNB-DU | gNB-distributed unit, Next Generation NodeB distributed unit | PEI | Permanent Equipment Identifiers | UwPTS | Uplink Pilot Time Slot |
| GNSS | Global Navigation Satellite System | PFD | Packet Flow Description | V2I | Vehicle-to-Infrastruction |
| GPRS | General Packet Radio Service | P-GW | PDN Gateway | V2P | Vehicle-to-Pedestrian |
| GPSI | Generic Public Subscription Identifier | PHICH | Physical hybrid-ARQ indicator channel | V2V | Vehicle-to-Vehicle |
| GSM | Global System for Mobile Communications, Groupe Spécial Mobile | PHY | Physical layer | V2X | Vehicle-to-everything |
| GTP | GPRS Tunneling Protocol | PLMN | Public Land Mobile Network | VIM | Virtualized Infrastructure Manager |
| GTP-U | GPRS Tunnelling Protocol for User Plane | PIN | Personal Identification Number | VL | Virtual Link, |
| GTS | Go To Sleep Signal (related to WUS) | PM | Performance Measurement | VLAN | Virtual LAN, Virtual Local Area Network |
| GUMMEI | Globally Unique MME Identifier | PMI | Precoding Matrix Indicator | VM | Virtual Machine |
| GUTI | Globally Unique Temporary UE Identity | PNF | Physical Network Function | VNF | Virtualized Network Function |
| HARQ | Hybrid ARQ, Hybrid Automatic Repeat Request | PNFD | Physical Network Function Descriptor | VNFFG | VNF Forwarding Graph |
| HANDO | Handover | PNFR | Physical Network Function Record | VNFFGD | VNF Forwarding Graph Descriptor |
| HFN | HyperFrame Number | POC | PTT over Cellular | VNFM | VNF Manager |
| HHO | Hard Handover | PP, PTP | Point-to-Point | VoIP | Voice-over-IP, Voice-over-Internet Protocol |
| HLR | Home Location Register | PPP | Point-to-Point Protocol | VPLMN | Visited Public Land Mobile Network |

TABLE 1-continued

| Abbreviations: | | | | | |
|---|---|---|---|---|---|
| HN | Home Network | PRACH | Physical RACH | VPN | Virtual Private Network |
| HO | Handover | PRB | Physical resource block | VRB | Virtual Resource Block |
| HPLMN | Home Public Land Mobile Network | PRG | Physical resource block group | WiMAX | Worldwide Interoperability for Microwave Access |
| HSDPA | High Speed Downlink Packet Access | ProSe | Proximity Services, Proximity-Based Service | WLAN | Wireless Local Area Network |
| HSN | Hopping Sequence Number | PRS | Positioning Reference Signal | WMAN | Wireless Metropolitan Area Network |
| HSPA | High Speed Packet Access | PRR | Packet Reception Radio | WPAN | Wireless Personal Area Network |
| HSS | Home Subscriber Server | PS | Packet Services | X2-C | X2-Control plane |
| HSUPA | High Speed Uplink Packet Access | PSBCH | Physical Sidelink Broadcast Channel | X2-U | X2-User plane |
| HTTP | Hyper Text Transfer Protocol | PSDCH | Physical Sidelink Downlink Channel | XML | eXtensible Markup Language |
| HTTPS | Hyper Text Transfer Protocol Secure (https is http/1.1 over SSL, i.e. port 443) | PSCCH | Physical Sidelink Control Channel | XRES | EXpected user RESponse |
| I-Block | Information Block | PSSCH | Physical Sidelink Shared Channel | XOR | eXclusive OR |
| ICCID | Integrated Circuit Card Identification | PSCell | Primary SCell | ZC | Zadoff-Chu |
| IAB | Integrated Access and Backhaul | PSS | Primary Synchronization Signal | ZP | Zero Po |
| ICIC | Inter-Cell Interference Coordination | PSTN | Public Switched Telephone Network | | |
| ID | Identity, identifier | PT-RS | Phase-tracking reference signal | | |
| IDFT | Inverse Discrete Fourier Transform | PTT | Push-to-Talk | | |
| IE | Information element | PUCCH | Physical Uplink Control Channel | | |

The foregoing description provides illustration and description of various example embodiments, but is not intended to be exhaustive or to limit the scope of embodiments to the precise forms disclosed. Modifications and variations are possible in light of the above teachings or may be acquired from practice of various embodiments. Where specific details are set forth in order to describe example embodiments of the disclosure, it should be apparent to one skilled in the art that the disclosure can be practiced without, or with variation of, these specific details. It should be understood, however, that there is no intent to limit the concepts of the present disclosure to the particular forms disclosed, but on the contrary, the intention is to cover all modifications, equivalents, and alternatives consistent with the present disclosure and the appended claims.

What is claimed is:

1. An apparatus for a user equipment (UE) comprising:

a processing circuitry configured to:

transmit a request for sensing services to a network, the request including one or more parameters related to sensing;

receive an authorization response from the network based on a UE's subscription status and privacy settings;

execute sensing functions locally on the UE upon receiving authorization from the network;

transmit sensing data to the network for exposure to authorized clients; and update a UE's sensing privacy profile related to the sensing data via a communication with a network function, wherein the processing circuitry is further configured to update the sensing privacy profile via an N1 Non-Access Stratum (NAS) message transmitted to the network, for dynamic changes to the privacy settings; and a memory to store the one or more parameters.

2. The apparatus of claim 1, wherein the processing circuitry is further configured to verify the privacy settings with a User Data Management (UDM) system before transmitting the sensing data to the network.

3. The apparatus of claim 2, wherein the processing circuitry is further configured to decline sending the sensing data if the privacy settings do not allow sharing of the sensing data with any external network entities.

4. The apparatus of claim 1, wherein the processing circuitry is further configured to transmit an enrollment request to a network function or Application Function (AF) for initiating a sensing session after receiving authorization from the network.

5. The apparatus of claim 1, wherein the processing circuitry is further configured to receive a notification from the network indicating whether the sensing data can be exposed to a peer UE based on locally configured privacy settings.

6. The apparatus of claim 1, wherein the processing circuitry is further configured to disable access to the sensing data by unauthorized network clients or Application Functions (AFs).

7. The apparatus of claim 1, wherein the processing circuitry is further configured to initiate a sensing service session by verifying the sensing privacy profile of a peer UE before transmitting any sensing data to the peer UE.

8. The apparatus of claim 6, wherein the processing circuitry is further configured to receive updates from the network regarding any changes to the sensing privacy profile and apply those updates dynamically.

9. The apparatus of claim 1, wherein the processing circuitry is further configured to communicate with a privacy management system to enforce global privacy parameters that control whether the sensing data can be shared based on predefined privacy classes.

10. A non-transitory computer-readable medium storing computer-executable instructions which when executed by one or more processors result in performing operations comprising:

transmitting a request for sensing services to a network, the request including one or more parameters related to sensing;

receiving an authorization response from the network based on a UE's subscription status and privacy settings;

executing sensing functions locally on the UE upon receiving authorization from the network;

transmitting sensing data to the network for exposure to authorized clients; and updating a UE's sensing privacy profile related to the sensing data via a communication with a network function, wherein updating the sensing privacy profile is via an N1 Non-Access Stratum (NAS) message transmitted to the network, for dynamic changes to the privacy settings.

11. The non-transitory computer-readable medium of claim 10, wherein the operations further comprise verify the privacy settings with a User Data Management (UDM) system before transmitting the sensing data to the network.

12. The non-transitory computer-readable medium of claim 11, wherein the operations further comprise decline sending the sensing data if the privacy settings do not allow sharing of the sensing data with any external network entities.

13. The non-transitory computer-readable medium of claim 10, wherein the operations further comprise transmitting an enrollment request to a network function or Application Function (AF) for initiating a sensing session after receiving authorization from the network.

14. The non-transitory computer-readable medium of claim 10, wherein the operations further comprise receiving a notification from the network indicating whether the sensing data can be exposed to a peer UE based on locally configured privacy settings.

15. The non-transitory computer-readable medium of claim 10, wherein the operations further comprise disable access to the sensing data by unauthorized network clients or Application Functions (AFs).

16. The non-transitory computer-readable medium of claim 10, wherein the operations further comprise initiating a sensing service session by verifying the sensing privacy profile of a peer UE before transmitting any sensing-data to the peer UE.

17. The non-transitory computer-readable medium of claim 15, wherein the operations further comprise receiving updates from the network regarding any changes to the sensing privacy profile and apply those updates dynamically.

18. A method comprising:

transmitting a request for sensing services to a network, the request including one or more parameters related to sensing;

receiving an authorization response from the network based on a UE's subscription status and privacy settings;

executing sensing functions locally on the UE upon receiving authorization from the network;

transmitting sensing data to the network for exposure to authorized clients; and updating a UE's sensing privacy profile related to the sensing data via a communication with a network function, wherein updating the sensing privacy profile is via an N1 Non-Access Stratum (NAS) message transmitted to the network, for dynamic changes to the privacy settings.

* * * * *